US008752197B2

(12) United States Patent
Bolle et al.

(10) Patent No.: US 8,752,197 B2
(45) Date of Patent: Jun. 10, 2014

(54) APPLICATION INDEPENDENT SYSTEM, METHOD, AND ARCHITECTURE FOR PRIVACY PROTECTION, ENHANCEMENT, CONTROL, AND ACCOUNTABILITY IN IMAGING SERVICE SYSTEMS

(75) Inventors: Rudolf M. Bolle, Bedford Hills, NY (US); Lisa M. Brown, Pleasantville, NY (US); Jonathan H. Connell, Cortlandt Manor, NY (US); Arun Hampapur, White Plains, NY (US); Sharatchandra Pankanti, Mount Kisco, NY (US); Andrew W. Senior, New York, NY (US); Ying-Li Tian, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 10/175,236

(22) Filed: Jun. 18, 2002

(65) Prior Publication Data

US 2003/0231769 A1    Dec. 18, 2003

(51) Int. Cl.
*H04L 29/06* (2006.01)
*H04L 9/08* (2006.01)

(52) U.S. Cl.
CPC .................................. *H04L 9/0847* (2013.01)
USPC ........................................................ 726/28

(58) Field of Classification Search
CPC ............................ H04L 9/0847; H04L 9/3073
USPC .................................................... 726/17, 28
See application file for complete search history.

(56) References Cited

U.S. PATENT DOCUMENTS

| 5,195,135 | A  | * | 3/1993  | Palmer .......................... 380/241 |
| 5,659,614 | A  | * | 8/1997  | Bailey, III ...................... 713/165 |
| 5,689,718 | A  | * | 11/1997 | Sakurai et al. ................. 715/205 |
| 6,031,575 | A  | * | 2/2000  | Suzuki et al. ............. 375/240.14 |
| 6,886,098 | B1 | * | 4/2005  | Benaloh ......................... 713/193 |
| 6,931,531 | B1 | * | 8/2005  | Takahashi ..................... 713/167 |
| 6,937,730 | B1 | * | 8/2005  | Buxton ......................... 380/241 |
| 2002/0010860 | A1 | * | 1/2002 | Chu .............................. 713/182 |
| 2002/0065678 | A1 | * | 5/2002 | Peliotis et al. .................... 705/1 |
| 2002/0087403 | A1 | * | 7/2002 | Meyers et al. .................. 705/14 |
| 2002/0150239 | A1 | * | 10/2002 | Carny et al. ..................... 380/37 |

OTHER PUBLICATIONS

Fuller, Chuck, "Deploying Video on the Web: Logging, Searching, and Streaming", Dec. 1999, pp. 1-7, obtained from http://www.edusite.nl/docs/webstroom/deploying_video_on_the_web_.pdf and http://www.webtechniques.com/archives/1999/12/fuller/.*

(Continued)

*Primary Examiner* — Jeffrey D Popham
(74) *Attorney, Agent, or Firm* — Tutunjian & Bitetto, P.C.; Matthew Chung

(57) ABSTRACT

The system and method obscures descriptive image information about one or more images. The system comprises a selector for selecting the descriptive image information from one or more of the images, a transformer that transforms the descriptive information into a transformed state, and an authorizer that provides authorization criteria with the image. In a preferred embodiment, the transformed state is the respective image encoded with the descriptive information. The descriptive information can be obscured so that the descriptive information in the transformed state can be decoded only if one or more authorization inputs satisfy the authorization criteria.

35 Claims, 15 Drawing Sheets

(56) References Cited

OTHER PUBLICATIONS

A Statistical Approach for Real-time Robust Background Subtraction and Shadow Detection, by Thanarat Horprasert, David Harwood and Larry S. Davis, Computer Vision Laboratory, University of Maryland, College Park, MD) 20742, pp. 1-19.

Recogizing faces in broadcast video by A.W. Senior, IBM T.J. Watson Research Center, Yorktown Heights, NY 10598, USA, pp. 1-6.

Face and feature finding for a face recognition system, Andrew W. Senior, IBM T.J. Watson Research Center, P.O. Box 704, Yorktown Heights, New York 10598-0218, pp. 1-6.

The Awreness-Privacy Tradeoff in Video Supported Informal Awareness:A Study of Image-Filtering Based Techniques by Qiang Alex Zhao, John T. Stasko, Graphics, Visualization and Usability Center, Georgia Institute of Technology, Atlanta, GA 30332-0280 USA, pp. 1-8.

Wallflower: Principles and Practice of Background Maintenance by Kentaro Toyama, John Krumm, Barry Burma, Brian Meyers, Microsoft Research, Redmond, WA 98052, pp. 1-7.

Learning and Recognizing Human Dynamics in Video Sequences by Christoph Bergler, Computer Science Division, University of California, Berkeley, Berkeley, CA 04720, pp. 568-574.

Pfinder: Real-Time Tracking of the Human Body by Christopher Richard Wren, Ali Azarbayejani, Trevor Darrell, and Alex Paul Pentland, pp. 780-785.

Algorithms for Cooperative Multisensor Surveillance by Robert T. Collins, Alan J. Lipton, Hironobu Fujiyoshi and Takeo Kanade, Fellow, IEEE, pp. 1456-1477.

Into the Woods: Visual Surveillance of Noncooperative and Camouflaged Targets in Complex Outdoor Settings by Terrance E. Boult, Member, IEEE, Ross J. Michaels, Xiang Gao, Member, IEEE, and Michael Eckmann, pp. 1382-1402.

Region Growing 5, pp. 149-165.

$W^4$: Real-Time Surveillance of People and Their Activities, by Ismail Haritaoglu, Member, IEEE, David Harwood, Member, IEEE, and Larry S. Davis, Fellow, IEEE, pp. 809-830.

3-D model-based tracking of humans in action: a multi-view approach by D.M. Gavrilla and L.S. Davis, Computer Vision Laboratory, CfAR, University of Maryland, College Park, MD 20742, U.S.A., pp. 73-80.

\* cited by examiner

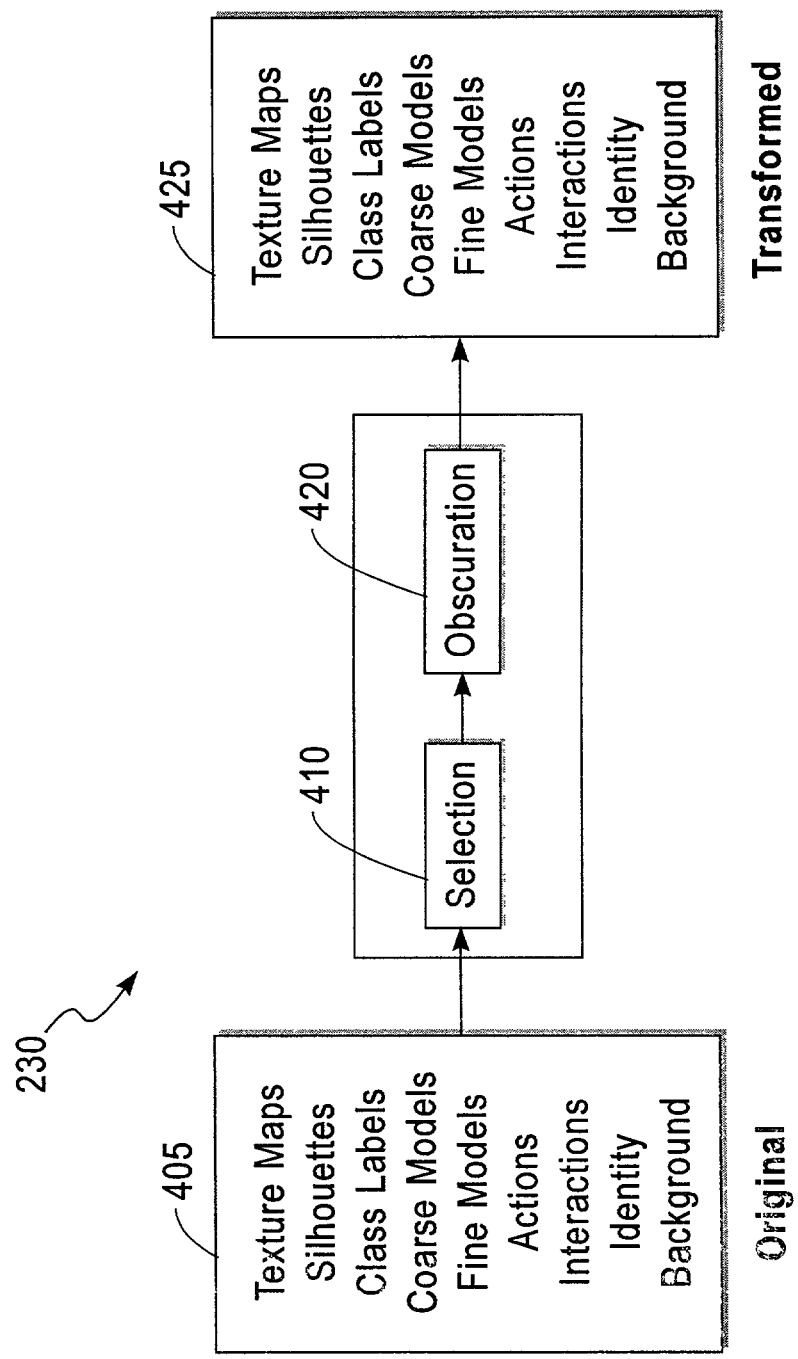

APPLICATION INDEPENDENT SYSTEM, METHOD, AND ARCHITECTURE FOR PRIVACY PROTECTION, ENHANCEMENT, CONTROL, AND ACCOUNTABILITY IN IMAGING SERVICE SYSTEMS

FIELD OF THE INVENTION

This invention relates to the field of automatic imaging systems, that are capable of automatically capturing images (still and video) of a scene based on a combination of the specifications provided by the user. More specifically, the invention relates to the control of the information flow within the system and control of the dissemination of the information to the users, designers, and administrators of the systems.

BACKGROUND OF THE INVENTION

As fraud and violent crime in our society is escalating, video monitoring/surveillance is being increasingly used to either deter the criminals or collect acceptable evidence against the perpetrators. These video-based systems include outdoor surveillance of the violence prone public spaces as well as the indoor surveillance of the automatic teller machines (ATMs) and stores/malls. Some of the indoor monitoring may involve relatively low resolution imagery while other video footage may be highly detailed and intrusive. For instance, the Forward Looking Infrared (FLIR) video technology enables acquiring visual information beyond common physical barriers (e.g., walls) and millimeter radar enables visualization of the naked human body of a fully clothed person.

Like collection of any other personal data (e.g., name, telephone numbers, address, credit card information), acquisition of video footage is also raising many concerns among the public about their privacy. The public would like to know who all are collecting their video footage and where this video information is being collected. What level of detailed imagery does the acquired data consists? Who will have access to the video or the processed results? To what purpose the acquired video information will/can be used? Will they know when the video footage is abused (e.g., used for the purpose beyond its intended/publicized purpose)? Can people have control over the video which contains their personal information (e.g., can they demand destruction of such data?).

Increased automation can be used for gleaning individual information over extended periods of time and/or providing highly individualized content service to the contracted parties. This disclosure provides a means of reaching agreeable conditions for exchanging (or not-exchanging) sensitive individual information as it relates to the content provided by video/images of people infested environments.

Problems with the Prior Art

Most of the video privacy literature consists of obliterating the raw video which may potentially contain personal information. For instance, Hudson's privacy ref protection scheme is based on the premise that lowering the information content will automatically obliterate the personal information. Low resolution imaging (footprints) has been used by IBM footprints For obscuring individual identity. People are imaged in overhead low resolution passive infrared band where each pixel captures 2 sq ft. In both the approaches, not only identity is obscured but also the other details which may not be necessarily related to individual privacy.

Protection of privacy using different methods is studied by Zhao and Stasko: See Zhao, Qiang Alex and Stasko, John T., "Evaluating Image Filtering Based Techniques in Media Space Applications", Proceedings of the 1998 Conference on Computer Supported Cooperative Work (CSCW '98), Seattle, Wash., November 1998, pp. 11-18.

Zhao and Stasko detect the moving objects in a video either by frame differencing or by background subtraction. In frame differencing, the $(n-1)^{th}$ video frame is pixelwise subtracted from the $n^{th}$ frame. If the pixel difference at location (e.g., $i^{th}$ row, $j^{th}$ column in the $n^{th}$ frame) is significantly large, it is inferred that there is a moving object at that location in that frame. In background subtraction, a pixelwise model of the background (e.g., static) objects in the scene is initially acquired and subsequently updated. If a pixel at location (e.g., $i^{th}$ row, $j^{th}$ column in the $n^{th}$ frame) is significantly different from its background model, it is inferred that there is a moving object at that location in that frame. Zhao and Stasko propose that the personal information is located within the pixels which cannot be explained by the background model and/or where the frame difference is large. If these pixels are masked/blanked out, they conjecture that the personal information in the video is obliterated. This method makes no distinction between moving objects, animals and humans. Further, there is no provision for a person to watch the original video which consists of exclusively their own personal data (e.g., was I wearing glasses that day?). Further, there is no provision for a person selectively watching their personal component of the data in a video which may show many people.

U.S. Pat. No. 5,615,391 issued to Klees, Mar. 25, 1997 of Eastman Kodak Company (also, EP 0 740 276 A2) discloses a system for an automated image media process station which displays images only while the customer present is detected thereby ensuring privacy. This disclosure detects presence of the customer using a camera installed in the self-development film processing kiosk and displays the photographic images being developed if the customer's presence is detected within field of view. This patent specifically relates to the privacy related to the single person detection and how it is applied to display of the images. It is not obvious how this disclosure can be extended to a larger set of scenarios where not only person identity is important but also the person's actions and location of the imaging may be need to be selectively displayed.

Privacam is a method of sharing the sensitive information as disclosed in the public domain literature (Dutch newspaper, NRC):
Big Brother gebreideld, Apr. 28, 2001
NRC HANDELSBLAD—WETENSCHAP
Http://www.nrc.nl/W2/Nieuws/2001/04/28/Vp/wo.html
The references herein cited are incorporated by reference in their entirety.

PrivaCam envisages a method of distributed encoding of the video frames by multiple parties so that viewing of each frame of video requires specific authorization is needed from all parties. This disclosure deals with control of the sensitive data by multiple parties. The scope of the disclosure does not provide methods for selective viewing of individual location, and actions.

U.S. Pat. No. 5,828,751 issued to Walker et al. On Oct. 27, 1998 titled Method and apparatus for secure measurement certification describes an invention where the measurements obtained from video are used for assuring the authenticity of the video. While this method is crucial to establishing the authenticity of the video evidence against (or in support of) an individual, it is not useful in providing general methods for protection of privacy of individuals depicted in the video.

U.S. Pat. No. 6,067,399 issued to Berger on May 23, 2000 titled "Privacy mode for acquisition cameras and camcorders" describes a method of detecting (skin tone) color of the objects being depicted in the video and selectively obscuring those colors so that the racial identity of the individuals depicted in the video is obliterated. The scope of the invention does not provide methods for selective viewing of individual location, and actions.

European Patent EP 1 081 955 A2 issued to Koji et al. on Jul. 3, 2001 titled "Monitor Camera system and method of displaying picture from monitor thereof" envisages masking out a predetermined portion of the field of view of camera covering "privacy zone". For example, a public road in view of a camera monitoring a private property may blank out public road traffic from the camera field of view so that only the remaining portion is clearly visible in the video. One of the limitations of this invention is that it does not comprehensively deal with a number of aspects related with the individual privacy (e.g., actions, individual identity based selective viewing).

OBJECTS OF THE INVENTION

An object of this invention is to provide individual/collective control of the way the sensitive information in the content of an image is being used.

An object of this invention is to segment sensitive information, like images, from an larger image, transform the segmented sensitive information, and control access to the transformed information.

SUMMARY OF THE INVENTION

The present invention is a system and method for obscuring descriptive image information about one or more images. The system comprises a selector for selecting the descriptive image information from one or more of the images, a transformer that transforms the descriptive information into a transformed state, and an authorizer that provides authorization criteria with the image. In a preferred embodiment, the transformed state is the respective image encoded with the descriptive information. The descriptive information can be obscured so that the descriptive information in the transformed state can be decoded only if one or more authorization inputs satisfy the authorization criteria.

BRIEF DESCRIPTION OF THE FIGURES

FIG. 4 describes an overview of a typical instantiation of transformation method undergone by information extracted from video.

DETAILED DESCRIPTION OF THE INVENTION

Figure 1:
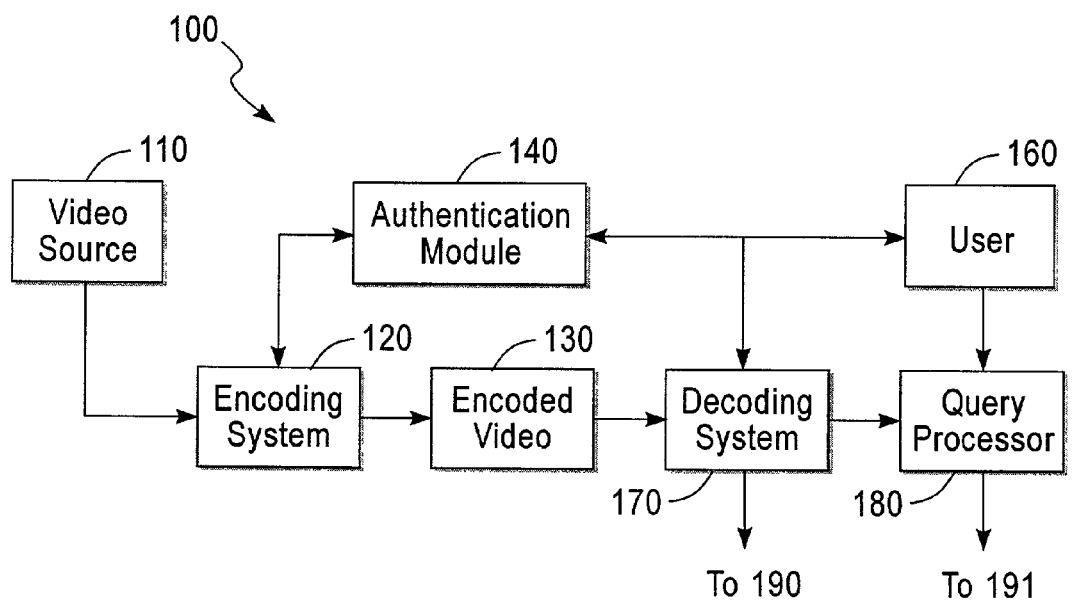
FIG. 1 describes the overall architecture of a typical instantiation of the system.

The invention enables the content in the video to be selectively obscured/encrypted so that only authorized individuals have access to the sensitive information within the video and unauthorized individuals will only be able to access relatively insensitive information. Video generated by a typical video source 110 is fed into an encoding system 120 to generate an encoded video 130. The encoded video may consist of a combination of a means of selectively transforming of the original video information and a means of selectively encrypting different components of the transformed video information. The role of transformation is to any combination of the following functions: hiding sensitive video information, removing sensitive video information, distorting sensitive information. The role of the encryption is to provide selective access to the (transformed) video information to authorized users only. The encoded video 130 is thus a combination of transformed and encrypted video. The encoded video is decoded using a decoding system 170. The role of the decoding to is regenerate the transformed video information. The authentication module 140 shows a means for verifying the authorizations of the users 160, generating appropriate keys for encoding and decoding the video. A query processor 180 facilitates restriction of user 160 access to only statistical information 191 within the video. Some authorized users based on their authorization can access the decoded video 190. By selective access to decoded video and statistical query processor, access to sensitive individual information can be controlled.

Figure 2:
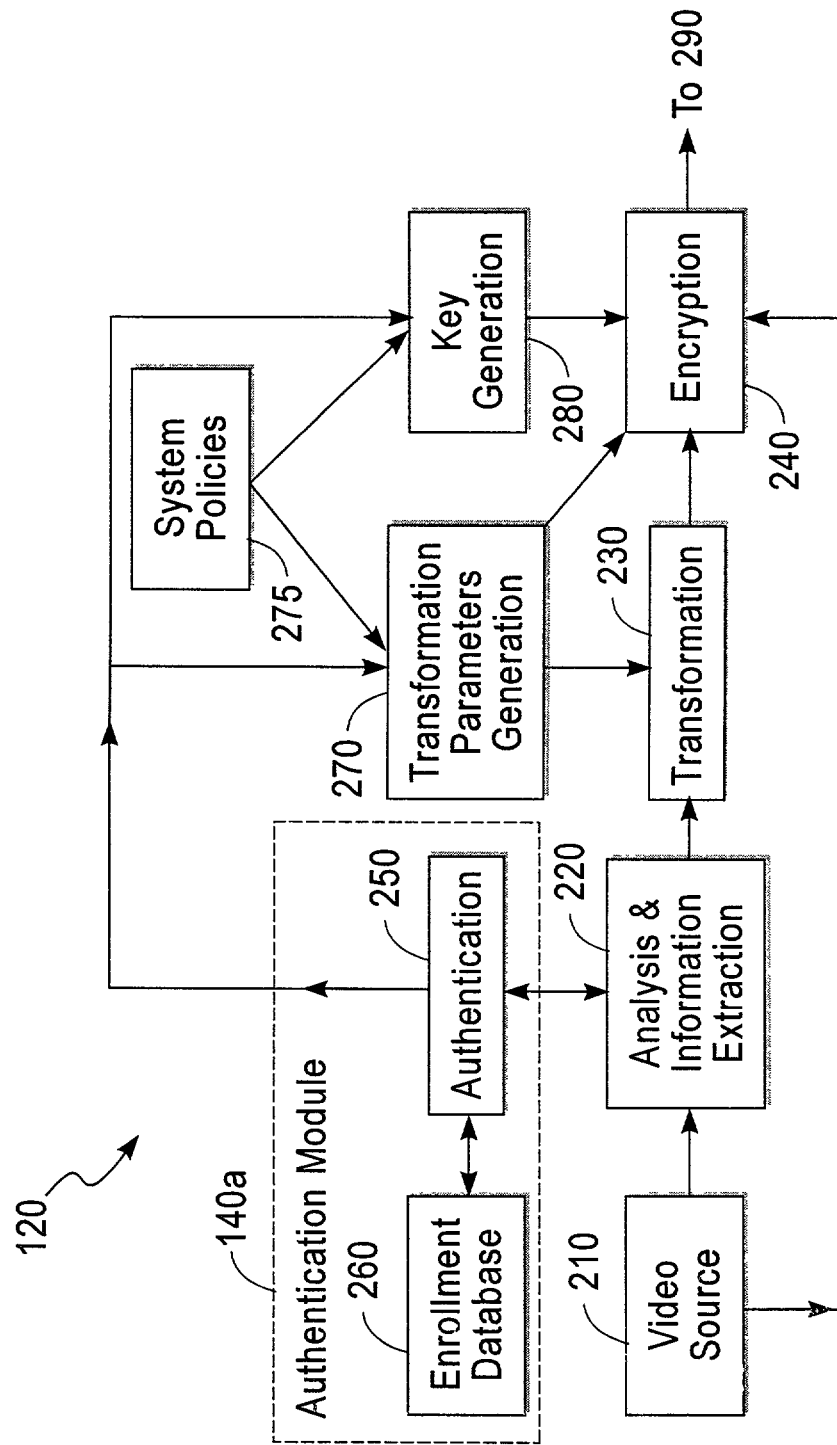
FIG. 2 presents an overview of a typical instantiation of the encoding system.

Referring to FIG. 2 presents further details of encoding system 120. A video source 210 represents one or more video sources. Each video source 210 could be either be a live camera or video file representing a camera input. Further, the camera could be either a static camera or dynamically controlled (e.g., pan-tilt-zoom) camera. The video consists of a sequences of images captured at successive time instants. Each image is called a frame. A video is typically characterized by the frequency of frame capture (e.g., frames per seconds), the resolution of each frame (e.g., pixels per frame), and the format in which the frames are represented (e.g., NTSC, MPEG2). It is typically assumed that all the video sources in a system are time synchronized (i.e., if frame m in video source 1 and frame n in video source 2 represent events are time t, then all other frames m+i in video source 1 and n+j in video source 2 represent the events at time t').

Encoding system 120 performs analysis of the video from 110 and extracts information from the video. Encoding process results in many useful pieces of information about the content of the video. A preferred instantiation of the video analysis system 120 results in information about the background (static) objects in the scene and about the moving objects (e.g., foreground) objects in the scene. A more preferred instantiation of 120 presents many additional attributes (e.g., locations, category, actions, interactions) of the foreground objects in the scene at successive times (e.g., frames). Further, 120 classifies each foreground object into various categories, at least one category being humans. Examples of other categories include vehicles, animals.

The appearance of the foreground regions are transmitted to an authentication module 140. Authentication module 140 (also see FIG. 3) identifies foreground region (e.g., humans) by comparing (e.g., matching) 250 the foreground region appearance and on the appearance of the known objects in the enrollment database 260. The enrollment database stores the information about the identities, biometrics, authorizations, and authorization codes of the enrolls in a database. That is, for instance, given an identity, the enrollment database can release information about the appearance (biometrics), appropriate authorization codes corresponding to that identity to the authentication module either in encrypted form or in unencrypted form.

Authentication modules 140 determines the identity of the objects represented by the foreground regions. The identity can be determined by the visual appearance of the objects in the video and/or a distinctive (may or may not be visual, e.g., radio frequency identification) signature emitted by the object. The following references describe specific instantiations of the authentication module operation. See:
A. W. Senior. Face and Feature Finding for a Face Recognition System In proceedings of Audio- and Video-based Biometric Person Authentication '99 pp. 154-159. Washington D.C. USA, Mar. 22-24, 1999
A. Senior. Recognizing faces in broadcast video, in proceedings of IEEE International Workshop on Recognition, Analysis, and Tracking of Faces and Gestures in Real-Time Systems ICCV 1999.

These references herein cited are incorporated by reference in their entirety.

Authentication modules 140 may identify the objects based on a prior enrollment of the objects into a enrollment database. For instance, different appearances/signatures of a known object may be previously stored/registered within a database. Individuals objects (e.g., cars, persons) may then be identified by comparing the appearance/signature associated with a foreground region with those in the enrollment database. This method of identifying the objects is referred to as absolute identification.

On the other hand, each time a foreground region appears in the video, authentication module 140 may compare it against the appearances of the previously seen object foreground regions enrolled into an enrollment database 260 and determine whether a given foreground region can be explained based on the previously seen foreground regions or whether the given foreground region is associated with an object not seen heretofore. Based on the determination, the system associates the given foreground region with previously seen objects or enrolls the foreground regions as a new object into the enrollment database. This method identification does not absolutely determine the identity of object associated with a foreground region (e.g., William Smith) but only relatively identifies a foreground region associated with an object with respect to previously observed object foreground regions. This method of identification is referred to as relative identification.

Authentication modules 140 may use any combination of relative and absolute identification to identify the objects associated with the foreground regions. Authentication modules 140 may either use entire foreground region associated with an object or only portions of the foreground regions associated with an object. For instance, known parts of an object (e.g., face of a human) segmented by 370 (see FIG. 3) may be used by the authentication module 140 to determine the object identity.

Authentication module 140 may use any biometric identifier for authenticating the appearance of the humans. One of the preferred methods of authentication of humans is based on their faces.

The following reference describes an example the state of the prior art identity authentication system using face recognition. See:
A. W. Senior. Face and Feature Finding for a Face Recognition System In proceedings of Audio- and Video-based Biometric Person Authentication '99 pp. 154-159. Washington D.C. USA, Mar. 22-24, 1999
A. Senior. Recognizing faces in broadcast video, in proceedings of IEEE International Workshop on Recognition, Analysis, and Tracking of Faces and Gestures in Real-Time Systems ICCV 1999.

These references herein cited are incorporated by reference in their entirety.

One of the functions of the identity authentication systems is to assist in labeling the foreground objects. The objects recognized as same will be labeled identically. The label identity association is passed on to a key generation block. One of the functions served by the authentication module is to provide identity related information to key generation (280) and the transformation parameter generation (270) processes. Both key generation and transformation parameter generation processes in accordance with the system policies (275) generate appropriate control information in the system to determine the output of the encoding system. For instance, a particular system may want to implement blocking all the identity information of some specific individuals. In such situation, the identities information of all individuals is passed on by the authentication module (140*a*) to the transformation parameters generation (270). Given this information to transformation parameter generation and the list of identities to blocked by the system policies module (275), the transformation parameter generation generates "block identity" transformation on that particular individual to the transformation (230).

Key generation module (280) facilitates selective encoding of the sensitive information so that only specific individuals can (at the decoding end) be able to access selective video information. For instance, say the system policies dictate that a specific individual (John Smith) be able to watch his own tracks to finest possible details (at the decoding end) and block all other users from watching fine details of John Smith's tracks. Given the identity information from the authentication module (140*a*), the key generation process (280) generates identity specific key to encode finest details of track information. The process of encryption (240) is also influenced by the transformation generation process (270).

Once the foreground objects are labeled by authentication module 140, they may undergo any combination of transformations by 230. The transformations 230 are performed on any sensitive information available within the foreground/background appearance. This invention envisages any combination of the following transformations to protect the sensitive information in the video: a change of a background of the image, a change in sequence of two or more frames of the image, a removal of one or more frames of the image, insertion of one or more additional frames in the image, a change of an identity of one or more objects in the image, a removal of one or more objects in the image, a replacement of one or more objects in the image with a replacement object, a replacement of one or more object in the image with a neutral replacement object, a change in one or more tracks in the image, a replacement of one or more tracks with a replacement track in the image, a deletion of one or more tracks of the image, an insertion of one or more inserted tracks in the image, a change in an action in the image, a removal of an action in the image, a replace of an action in the image with a replacement action, a change of an interaction in the image, a deletion of an interaction in the image, a replacement of an interaction in the image with a replacement interaction, an addition of an additional interaction to the image, a change in a model, an addition of one or more models, a replacement of one or more models, a deletion of one or more models, a change in one or more labels, a replacement of one or more labels, an addition of one or more labels, and a deletion of a label.

The type of the transformations could be modulated by the transformation profile specified (either dynamically, statically, or statistically/randomly) by 270. The transformation parameters 270 prescribed in the transformation profile are determined by the results of the authentication from the authentication module.

The method transforming (obscuring) the descriptive information includes any one or more of the following: a change of a background of the image, a change in sequence of two or more frames of the image, a removal of one or more frames of the image, insertion of one or more additional frames in the image, a change of an identity of one or more objects in the image, a removal of one or more objects in the image, a replacement of one or more objects in the image with a replacement object, a replacement of one or more object in the image with a neutral replacement object, a change in one or more tracks in the image, a replacement of one or more tracks with a replacement track in the image, a deletion of one or more tracks of the image, an insertion of one or more inserted tracks in the image, a change in an action in the image, a removal of an action in the image, a replace of an action in the image with a replacement action, a change of an interaction in the image, a deletion of an interaction in the image, a replacement of an interaction in the image with a replacement interaction, an addition of an additional interaction to the image, a change in a model, an addition of one or more models, a replacement of one or more models, a deletion of one or more models, a change in one or more labels, a replacement of one or more labels, an addition of one or more labels, and a deletion of a label.

The transformed objects are encrypted with (e.g., with public) keys specified by the key generation scheme 280. One of the properties of the key generation scheme is that consistently labeled objects are encrypted with consistent encryption keys.

Figure 3:
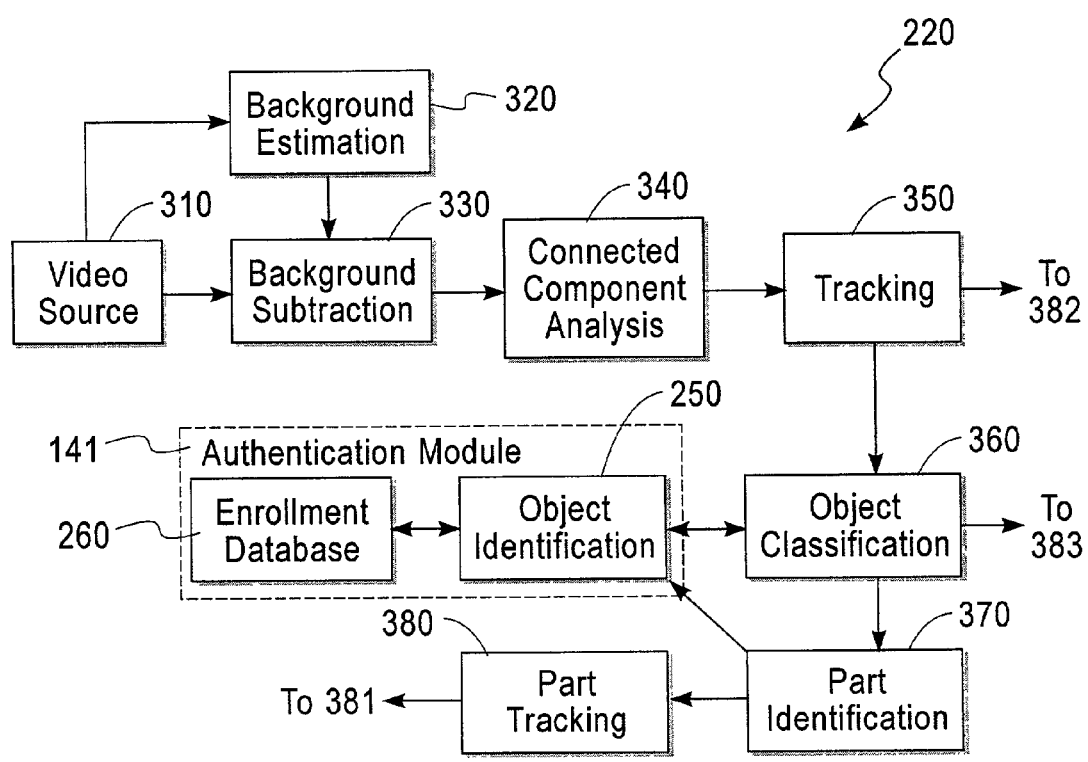
FIG. 3 illustrates a typical instantiation of video analysis and information extraction system.

FIG. 3 presents details of a typical instantiation 220 of video analysis and information extraction.

A video source 310 represents one or more video sources. Each video source could be either be a live camera or video file representing a camera input. Further, the camera could be either a static camera or dynamically controlled (e.g., pan-tilt-zoom) camera. The video consists of a sequences of images captured at successive time instants. Each image is called a frame. A video is typically characterized by the frequency of frame capture (e.g., frames per seconds), the resolution of each frame (e.g., pixels per frame), and the format in which the frames are represented (e.g., NTSC, MPEG2). It is typically assumed that all the video sources in a system are time synchronized (i.e., if frame m in video source 1 and frame n in video source 2 represent events are time t, then all other frames m+i in video source 1 and n+j in video source 2 represent the events at time t'). f1 600, f2 1000 are examples of video frames from a video source at different times t1 and t2, respectively.

A background estimation module 320 is designed to estimate the information about the appearance relatively static objects in the scene, e.g., furniture, walls, sky etc. One method for background estimation assumes that the background is constant and will never change. This method will estimate the background objects only once (e.g., by using one or more video frames of the scene when no objects are in the field of view of the camera pointing to the scene) and from there onwards, use these static estimates of the background for the rest of the video processing.

The following reference describes an example the state of the prior art static background estimation method 320:
T. Horprasert, D. Harwood, and L. S. Davis. A statistical approach for real-time robust background subtraction and shadow detection. In IEEE International Conference on Computer Vision ICCV'99 Frame-Rate Workshop, 1999.

This reference herein is incorporated by reference in its entirety.

It is also possible to use other methods of background estimation 320 and use of such methods are within the scope of this invention. For instance, some background estimation algorithms will frequently update their estimates of the appearance of the background (e.g., every video frame or every few video frames) based on the currently arriving video frame.

The following reference describes an example the state of the prior art dynamic background estimation method:
K. Toyama, J. Krumm, B. Brumitt and B. Meyers, Wallflower: principles and practice of background maintenance, In IEEE International Conference on Computer Vision ICCV'99, pages 255-261, Volume 1, 1999.

This reference herein is incorporated by reference in its entirety.

Given a (static or dynamic) estimate of the appearance of the background, 330 compares the currently arriving frame of video with the estimate of the background appearance to determine the foreground (i.e., not background) objects. A background subtraction 330 function is performed on the input video frame. Typically, the background subtraction involves sophisticated image processing operation (and not simply a direct difference of the arriving frame and the background Estimate).

The following reference describes an example the state of the prior art static background subtraction method:
T. Horprasert, D. Harwood, and L. S. Davis. A statistical approach for real-time robust background subtraction and shadow detection. In IEEE International Conference on Computer Vision ICCV'99 Frame-Rate Workshop, 1999.

This reference herein is incorporated by reference in its entirety. Other examples include
K. Toyama and J. Krumm and B. Brumitt and B. Meyers, Wallflower: principles and practice of background maintenance,
International Conference on computer vision (ICCV99), Pages 255-261, volume 1, 1999.
    Into the woods: visual surveillance of noncooperative and camouflaged
    targets in complex outdoor settings
    Boult, T. E.; Micheals, R. J.; Xiang Gao; Eckmann, M.
    Proceedings of the IEEE, Volume: 89 Issue: Oct. 10, 2001
    Page(s): 1382-1402.

This reference herein is incorporated by reference in its entirety.

Once all the foreground pixels are determined by the background subtraction 330, the mutually adjacent (e.g., connected) foreground pixels are grouped into single regions by a component analysis module 340. Further, in a preferred embodiment, the foreground regions comprising fewer than a threshold number T number of pixels are discarded (e.g., reclassified as background pixels). This procedure is referred to as connected component analysis 340. As a result of this processing, the foreground pixels identified by 330 are apportioned into foreground regions comprising of a sufficiently large number of pixels.

The following reference describes an example the state of the prior art connected component analysis method:
D. H. Ballard and Christopher M. Brown, "Computer Vision—Region Growing", Department of Computer Science, University of Rochester, Rochester, N.Y., Prentice-Hall, Inc., Englewood Cliffs, N.J. 07632, pp. 149-165, 1982
This reference herein is incorporated by reference in its entirety.

A tracking module, 350 relates the foreground regions of frame n to those from earlier frames. Each foreground region in the current frame may represent an entirely new object, may correspond to foreground region from previous frames depicting moving object. Some of the previously seen objects (e.g., foreground regions from previous video frames) do not appear in the current frame because either these objects may have been occluded by other objects or these objects may have left the field of the camera. Locations of foreground regions corresponding to a single object in the successive video frames defines a track. The process of identifying the relationship among the foreground regions of different video frames (e.g., do two given foreground regions from two video frames depict same object or different object) is called tracking.

The basis for the determination of such relationships may include a combination of one or more of the following foreground region information: (a) the color of the foreground region or distribution of color of pixels within the foreground regions may be used to determine which foreground region in one video frame corresponds (or does not correspond) to which other foreground region in another video frame, (b) known/estimated speed/velocity (or their temporal distribution) of a foreground region may be used to determine which foreground region in one video frame corresponds (or does not correspond) to which other foreground region in another video frame (c) the shape/size of the foreground region or temporal distribution of shapes of the regions may be used to determine which foreground region in one video frame corresponds (or does not correspond) to which other foreground region in another video frame, (d) known ideal model of the foreground region may be used to determine which foreground region in one video frame corresponds (or does not correspond) to which other foreground region in another video frame.

The tracking module 350 identifies (and creates) a new track representation when a new (unseen till now) foreground region. 350 terminates a track when there are no more foreground regions corresponding to that track (e.g., last appearance of the foreground region corresponding to that object) in the successive video frames. The tracking module 350 continues (and updates) a track when it determines that a foreground region in the current video frame corresponds to a foreground region from a previous frame based on any combinations of the foreground region information described above.

It is possible that one or more (e.g., two) different objects come so sufficiently close to each other in the field of camera that they may be detected as a single foreground region in 340. This situation is called a merge. In such situation, the tracking module 350 also detects a merge and correctly identifies a merge and apportions fractions pixels of a single foreground region to different (previously seen) objects based on any combination of the foreground region information mentioned above. Further, the different regions thus split are correctly related to their corresponding previous foreground regions to continue their tracks.

On the other hand, it is also possible that a foreground region in the previous video may split into two separate foreground regions in the subsequent video frames. This situation is called a split. In such situation, 350 also detects a split—whether such a split is due to imaging noise/artifact in which case the two regions are treated as if they were single foreground region and the corresponding track is updated accordingly. If 350 determines that the regions are split due to separation of (heretofore detected as) a single object into two independent objects, the corresponding track is split into two tracks and their history/properties (e.g., shape, locations) are retrospectively updated.

The determination of tracks (e.g., position, size, shapes of an object at different video frames, i.e., times) enables the tracking module 350 to compute/estimate different additional attributes of the object (e.g., average speed, average velocity, instantaneous speed distributions, 3D orientation, gait). The tracking module 350 not only determines the tracks but also computes one or more these trajectory based attributes of (e.g., position, size, shapes, gross speeds, velocities, of an object at different video frames, i.e., times) each track.

Another function the tracking module 350 performs is filtering the tracks based on certain known properties of the tracks and updating the information about the scene accordingly. For instance, if detected foreground regions exhibit any real movement of a real object but only an artifacts of a movement for an extended period of time, it may determine such tracks to be spurious.

The following reference describes an example the state of the prior art tracking method:
I. Haritaoglu, D. Harwood, and L. S. Davis. W4: Real-time surveillance of people and their activities. IEEE Trans. Pattern Analysis and Machine Intelligence, 22(8):809-830, August 2000.
Pfinder: real-time tracking of the human body
Wren, C. R.; Azarbayejani, A.; Darrell, T.; Pentland, A. P.
Pattern Analysis and Machine Intelligence, IEEE Transactions on, Volume: 19 Issue: Jul. 7, 1997 Page(s): 780-785
These references are herein incorporated by reference in its entirety.

An object classification module 360 classifies the foreground object associated with each track into different object categories based on their shape, color, size, movement patterns (e.g., gait). Typical classification methods classify moving objects as vehicles, humans, animals.

The following reference describes an example the state of the prior art object/track classifier method:
I. Haritaoglu, D. Harwood, and L. S. Davis. W4: Real-time surveillance of people and their activities. IEEE Trans. Pattern Analysis and Machine Intelligence, 22(8):809-830, August 2000.
Algorithms for cooperative multisensor surveillance
   Collins, R. T.; Lipton, A. J.; Fujiyoshi, H.; Kanade, T.
   Proceedings of the IEEE, Volume: 89 Issue: Oct. 10, 2001
   Page(s): 1456-1477
These references are herein incorporated by reference in its entirety.

The foreground regions can be further analyzed. A part identification module 370 decomposes the foreground regions, classified by the tracking module 350 (say, as humans), into regions that represent parts of object (e.g., parts of human body). This decomposition may be based on the shape of the silhouette of the human body, the image texture (appearance), motion information (e.g., portions of the foreground region depicting a human body the current video frame most similar to the portions of the corresponding foreground region in the previous video depicting a known body part). This functionality is often termed as shape (body part) identification. The extent of the detailed body part decomposition depends upon image resolution, the application at hand, image details available. The foreground regions representing humans can be decomposed into any of the following body parts: (head, torso), (head, torso, left hand, right hand, left foot, right foot), (head, torso, left upper arm, left forearm, right upper arm, right forearm, left upper foot, left lower foot, right upper foot, right lower foot), or a set of body parts that include even more detailed description of the body including fingers, phalanges, so on and so forth. It is not necessary to choose a single body decomposition of the body into body parts and multiple decompositions of the a body shape into multiple body parts sets is also conceivable.

Once the body parts are identified, an estimate of the location, size, and pose of the body part can be estimated. One method of obtaining body part location, size, and pose by method of model fitting: each body part is modeled as an idealized shape (e.g., cylinder) and by fitting the idealized shape to the foreground region representing the body part, an estimate of the body part location, size, and pose is obtained. The part identification module 370 not only decomposes the foreground human regions into human body parts but also estimates location, size, pose of each body part.

The determination of position, size, shapes of parts of a human body as estimated by the part identification module 370 at different video frames, i.e., times enables a part tracking module 380 to compute/estimate different additional attributes of the parts of the body (e.g., average speed, average velocity, instantaneous speed distributions, 3D orientation) related to the trajectory of the body parts. Either the absolute trajectories of each body part (i.e., with respect to absolute frame of reference) may be estimated or the relative motions/trajectories of each body part may be computed with respect to frame of reference of determined by the overall body.

Given the body part position, size, and pose for each part at different times, the part tracking module 380 determines one or more trajectory based attributes of (e.g., velocity, speed, orientations of human body parts at different video frames, i.e., times) parts of a human body. By collating the tracks of the individual body parts over a period of time and by conjoining the interrelationships among the body parts facilitates inferring the actions (e.g., walking, running, loitering) of the humans seen in the video.

Given actions of the individuals in the scene and their body part positions, sizes, and poses at different times, the interactions (e.g., hand shake, fight) between the individuals in the scene can be concluded by the part tracking module 380. Similarly, actions of the individuals and their inter-relationship with other objects reveal information about object-human interactions. The part tracking module 380, by collating the tracks of the individual body parts over a period of time and by conjoining the interrelationships among the body parts and the other objects facilitates inferring the interactions (e.g., picking, grabbing) of the humans with the other objects seen in the video.

The following reference describes an example the state of the prior art fitting/articulation/action method:

D. M. Gavrila and L. S. Davis, 3-D Model-based tracking of humans in action: a multi-view approach, CVPR96, pages 73-80, 1996

C. Bregler and J. Malik, Video Motion Capture, University of California, Berkeley, Http://www.cs.berkeley.edu/~bregler/digmuy.html, 2001.

C. Bregler, Learning and Recognizing Human Dynamics in video sequences, CVPR97, pages 568-574, 1997.

These references are herein incorporated by reference in their entirety.

In summary, the video analysis and extraction process identifies foreground regions, tracks them, categorizes each object into categories (e.g., people, vehicles), segments each foreground region representing (say) a human into component body parts, tracks the body parts to infer the actions of individuals. Overall, video analysis and information extraction stage 220 provides overall object tracks, in case of (say) humans, it provides body part tracks (possibly at different resolutions) in addition to the overall body tracks. Other possible results of the video analysis processing include object labels (e.g., vehicles, birds, animals, humans), model fit parameters at different levels, silhouettes (same as regions in 340 without any "texture" information but only outlines of the regions), and texture maps (e.g., color of the pixels comprising regions in 340). Further, the objects tracks may contain information about the actions of the objects (381) and their interactions with the other objects (381). In addition, the tracks may contain information about the identity of the regions either in absolute form (e.g., John Smith) or in relative form (e.g., I saw this very same person in frame 385 but I do not know who she is). When absolute identity is required, the individuals objects are required to be enrolled into the database with the identity information (e.g., name) and identity vs measurements (e.g., biometrics) associations.

Each track encoding (object pose, overall object region silhouette, overall object appearance, overall object movement, object part movements, object actions, object interactions, object category, object identity) and background encoding (representation describing background scene) contains sufficient information in them to synthesize the object up to the information contained in the video to varying levels of abstraction representation. For instance, representations encoding of silhouette contains less detailed information than those contained in the texture maps (e.g., appearance in terms of color, edges, etc.). Similarly, representation containing detailed (refined) model fits (e.g., person region decomposed into upper arm, lower arm, upper leg, lower leg, abdomen, head) contains more information than that contained in the coarse model fit (e.g., hand, feet, abdomen, head) or object class labels (e.g., human, vehicle). Given the abstract representation about sizes, shapes, orientations of the body parts along with the information about the locations of the overall objects, their parts, their actions, and interactions in a video enables the system creation of a synthetic representation of video accentuating certain information in the video at the same time obscuring other information components in the video.

The function of the transformation method 230 is to selectively obscure one or more components of the information contained in the video that may potentially convey sensitive information. The transformation functionality is controlled by the transformation profile 270 which can be adjusted by the local system administrator and/or the results of the user authentication 141.

The information obscuration is performed in a joint manner. Some extracted information in video analysis stage (220) is permanently obscured in the transformed methods 230. Further, obscuration of the information occurs in the decoding method 170 which selectively decodes part or full information contained in the video. In other words, it is possible to remove components of detailed representations of the objects/tracks/background from encoded video representation at the source (e.g., 230) so that selective decryption 820 simply cannot obtained that component of detailed information from the encoded representation of video.

How 230 and 820 share their functionality to achieve a desired level of privacy protection is a system design issue. A highly conservative system may not trust (for instance) the integrity of the video decoding system and therefore may remove all the sensitive information from the encoded video representation. In such case, no authenticated (ordinary) user will ever be able to access the sensitive information. In other systems, the encoding systems may include all the detailed information (e.g., detailed models of humans) in the video; at the receiving end, the decoding system may not allow any ordinary user to access the raw video/transformed video but only the statistical information in the transformed video through the statistical query processor 890.

We will first describe the transformation method 230. The transformation module 230 comprises two primary methods: (de)selection methods of portions of video 410 and obscuration methods 420 as shown in FIG. 4. The selection methods 410 select a portion of the video or extracted video information and then obscuration methods 420 apply the obscuration methods to the selected portion of the video exclusively and produce the transformed video 425.

Figure 4A:
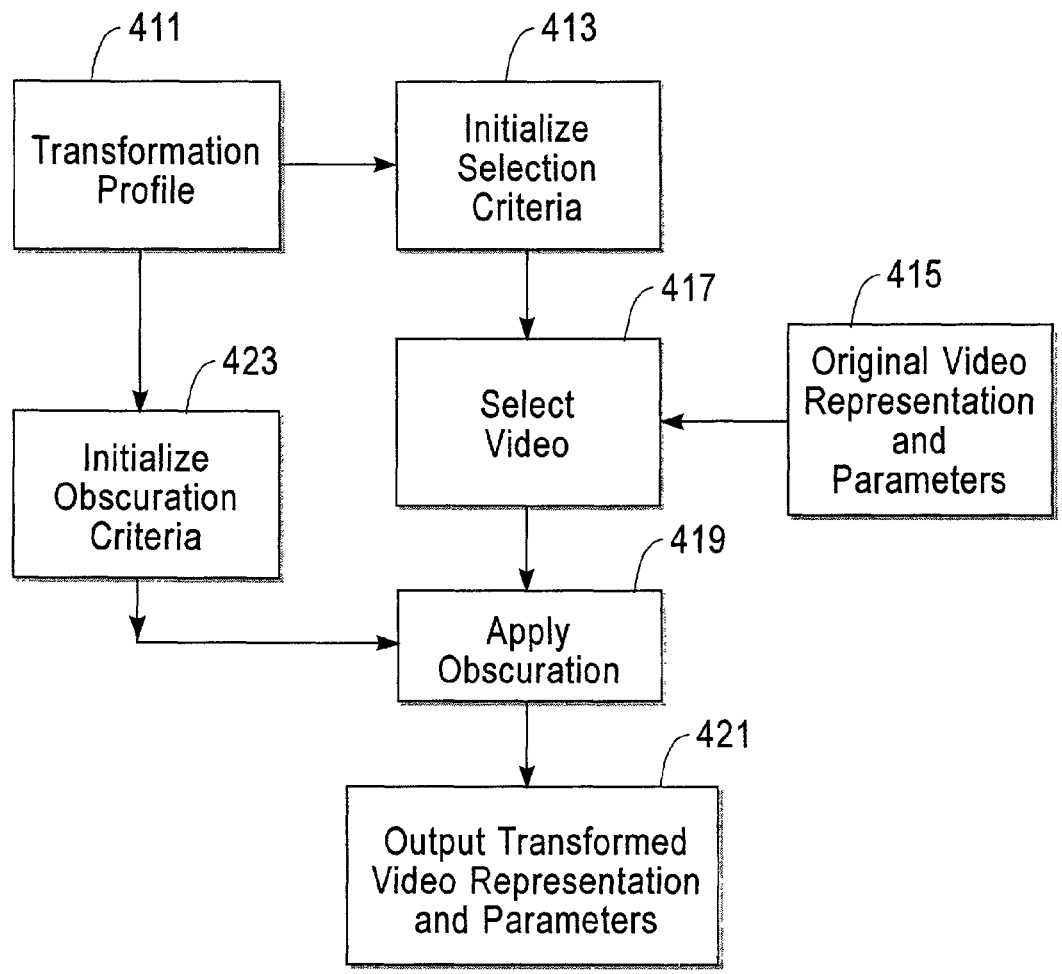
FIG. 4A is a flow chart of a transformation process.
Figure 5:
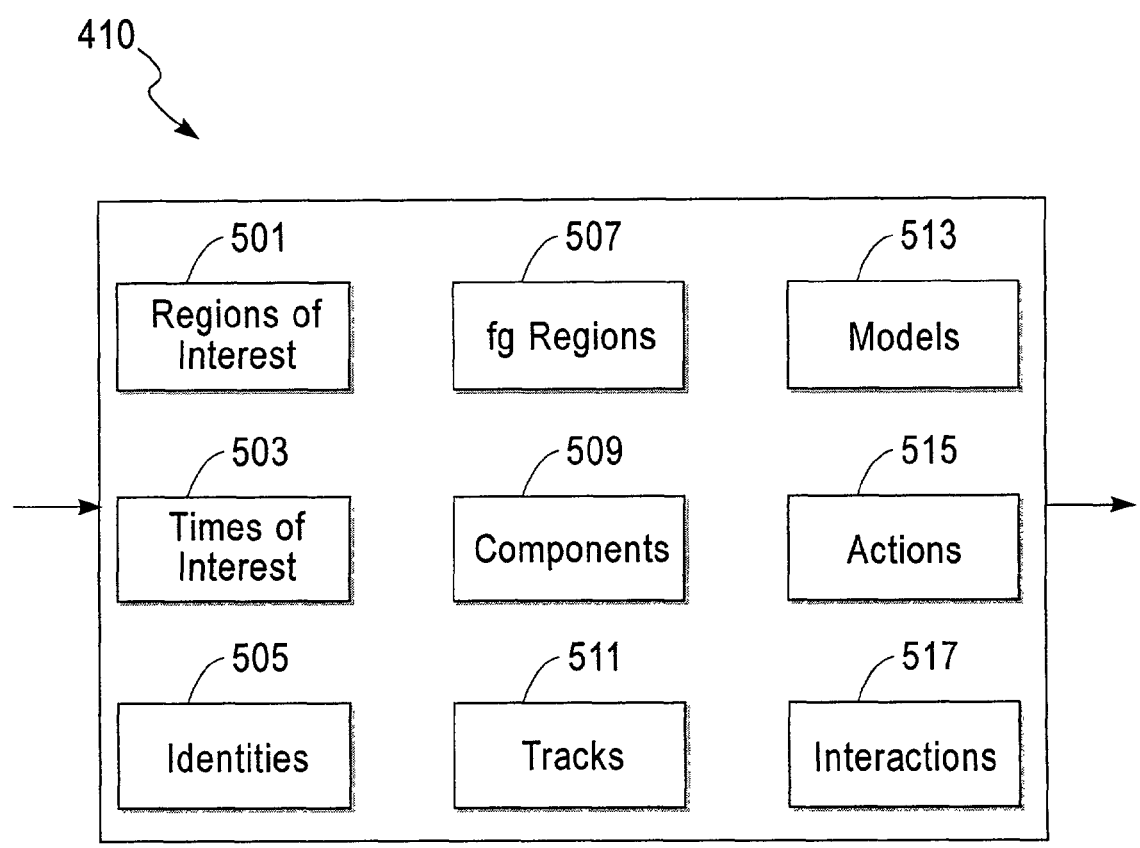
FIG. 5 shows typical different methods of selecting video information to be transformed.

The process of transformation method (230) is further explained in FIG. 4A. As mentioned earlier, the transformation method consists of selection methods (FIG. 5) and obscuration methods (FIG. 6). Similarly, the transformation process consists of selection process (717, FIG. 5A) followed by the obscuration process (719, FIG. 6A). The details of the method as a follows. Refer to FIG. 4A, at each instant of time.

FIG. 4A shows the process of transformation. Determined by the transformation profile 411 and the identities, locations, times etc. Of the video source content, the selection criteria are initialized 413. The process of the initialization could be a one time event or it could be occasional or it could be frequent. It can be triggered by the events in the scenery or it could driven by the administrative policies of the site or it could be remotely governed. Similarly, the obscuration criteria are also initialized (423).

At the onset every new video frame 415, the content of the video frame as represented by the encoding system 120 are compared by the selection process (417) against the selection policies prescribed at the time arrival of the video frame. An instance of the comparison could be, does the identity of person is included in the list of the identities to be selected as prescribed by the transformation profile? If the comparison yields an affirmative answer ("yes"), the representation in the frame is tagged to be "true" else the representation in the frame is tagged "false". The tagged frame representation of the frame is passed on to obscuration process (419). The process of obscuration selects one or more methods of obscuration depending upon the current obscuration parameters. If the current video frame representation is tagged (selected) and if the current obscuration method(s) are meaningful for application to the current tagged frame representation, it applies the obscuration method to the current tagged video frame representation. Else the current video frame representation remains same and no obscuration method is applied to the current frame. The current video frame representation (whether it is obscured or not) is then passed on (421) to the next stage of processing (240).

The tagging of the frame is a binary instance. It is limited to "yes" or "no". Thus a video frame representation is either selected or not selected depending upon the selection criteria.

It is within the contemplation of the present invention to have a more richer choice of tagging which conveys the decision of selection process more finely. For instance, the selection criteria may select not the entire video but only a selected portion (object) within the video frame representation and tag that portion (object) for the benefit of obscuration process. In such case, the obscuration process will only limit its operation to the selected portion (objects) within the current frame representation. It is also contemplation of the present invention to have the selection process not be based on frame-by-frame basis (either from efficiency or for richer selection/obscuration process). Such enrichments of the present invention are obvious to those skilled in the art and are entirely within the scope of the present invention.

The (de)selection methods as listed in FIG. 5 (410) consists of any combination of the methods described below. By default, the system may consider all portions of video selected, deselected, or any intermediate combination specified by the transformation policies prescribed by the transformation profile (270) and in its turn controlled by the authentication module 140.

One of the ways of selecting certain portions of video is based on the location 501. i.e., either to select or deselect locations within video. In this (de)selection operation, one or more regions within a camera view are (de)selected. The regions could be of arbitrary shape and potentially could include entire field of view or none of the field of view. The location can be for example described as a region of interest within a field of view of camera. In the most preferred instantiation, the (de)selected regions are specified in terms of regions in the video frame. In addition to the regions of interest, it is possible to (de)select the view/resolution of interest. For instance, in systems with pan-tilt-zoom cameras, it is possible to select a view of interest where a high resolution (e.g., zoomed-in) view of scene while deselecting the same scene with less detailed information. In calibrated (multi-)camera scenario and in situations where the correspondence between the actual world coordinates and the image coordinates are known & is invertible (e.g., by triangulation), the (de)selected regions could also be specified in terms of the world coordinates as a frustrums of viewing cones. In such situations, for instance, it is possible to select the objects in the view which are very close to camera and very far frame camera while excluding the objects in the intermediate range. The (de)selected regions can be static (permanently fixed), session static (fixed per session), or dynamic (frequently changing automatically, semi-automatically, and/or manually). When selected regions can be computed from deselected regions by exclusion.

One of the ways of selecting certain portions of video is based on the time 503, i.e., either to select or deselect durations within video. In this (de)selection operation, one or more time durations within a video time span are (de)selected. In the most preferred instantiation, the (de)selected durations are specified in terms of durations in the video frame. In time synchronized (multi-)camera scenario and in situations where the correspondence between the actual real time and the video frames are known & invertible, the (de)selected durations could also be specified in terms of the real time. The units of duration specification may not be a monotonic function of the real time (e.g., number of scene changes, number of sessions, number of temporal events). The (de)selected durations can be static (permanently fixed), session static (fixed per session), or dynamic (frequently changing automatically, semi-automatically, and/or manually). When selected durations can be computed from deselected durations by exclusion.

The (de)selection of video of interest can also accomplished by nature of the foreground regions (507). For instance, it is possible to (de)select the video when there are foreground regions with significant fraction of pixels with flesh tone color. Recall that the foreground regions are determined are determined in 330.

The (de)selection of video of interest can also accomplished by nature of the connected components 509. For instance, it is possible to (de)select the video when the number of connected components in the video equals/exceeds a specified number. Recall that connected components are determined in 340.

The (de)selection of video of interest can also accomplished by the nature of tracks 511. For instance, it is possible to (de)select the video when the length (e.g., time duration) of a track of a person significantly exceeds a average length of tracks made by other people in the scene in a sensitive area. Recall that the tracks are determined in 350.

The (de)selection of video of interest can also accomplished by the nature of object categories. For instance, it is possible to (de)select the video when certain configurations of object categories appear together in the scene (e.g., a person and a knife). Recall that the object categories are determined in 360.

The (de)selection of video of interest can also accomplished by the nature of identities 505. For instance, it is possible to (de)select the video when certain identities (e.g., registered visually impaired person) in the watch list appear in the scene in a sensitive area (e.g., swimming pool). Recall that the identities are determined in authentication module 141.

The (de)selection of video of interest can also accomplished by actions performed by the people in the scene 515. For instance, it is possible to (de)select the video when there are loitering people in the scene. The actions of the people in the scene are determined in 380.

The (de)selection of video of interest can also accomplished by nature of the interactions among humans or interactions between humans and objects in the scene 517. For instance, it is possible to (de)select the video when a person leaves an object behind in a scene or when two people share askance glances. The interactions among objects are determined in 380.

The (de)selection of video of interest can also accomplished by nature of the model fit 513. For instance, it is possible to (de)select the video when there are more than two persons presenting themselves in sufficient visual detail as to allow fine level model fit (e.g., head, torso, left upper arm, left forearm, right upper arm, right forearm, left upper foot, left lower foot, right upper foot, right lower foot). The model fitting is determined in 370.

Figure 5A:
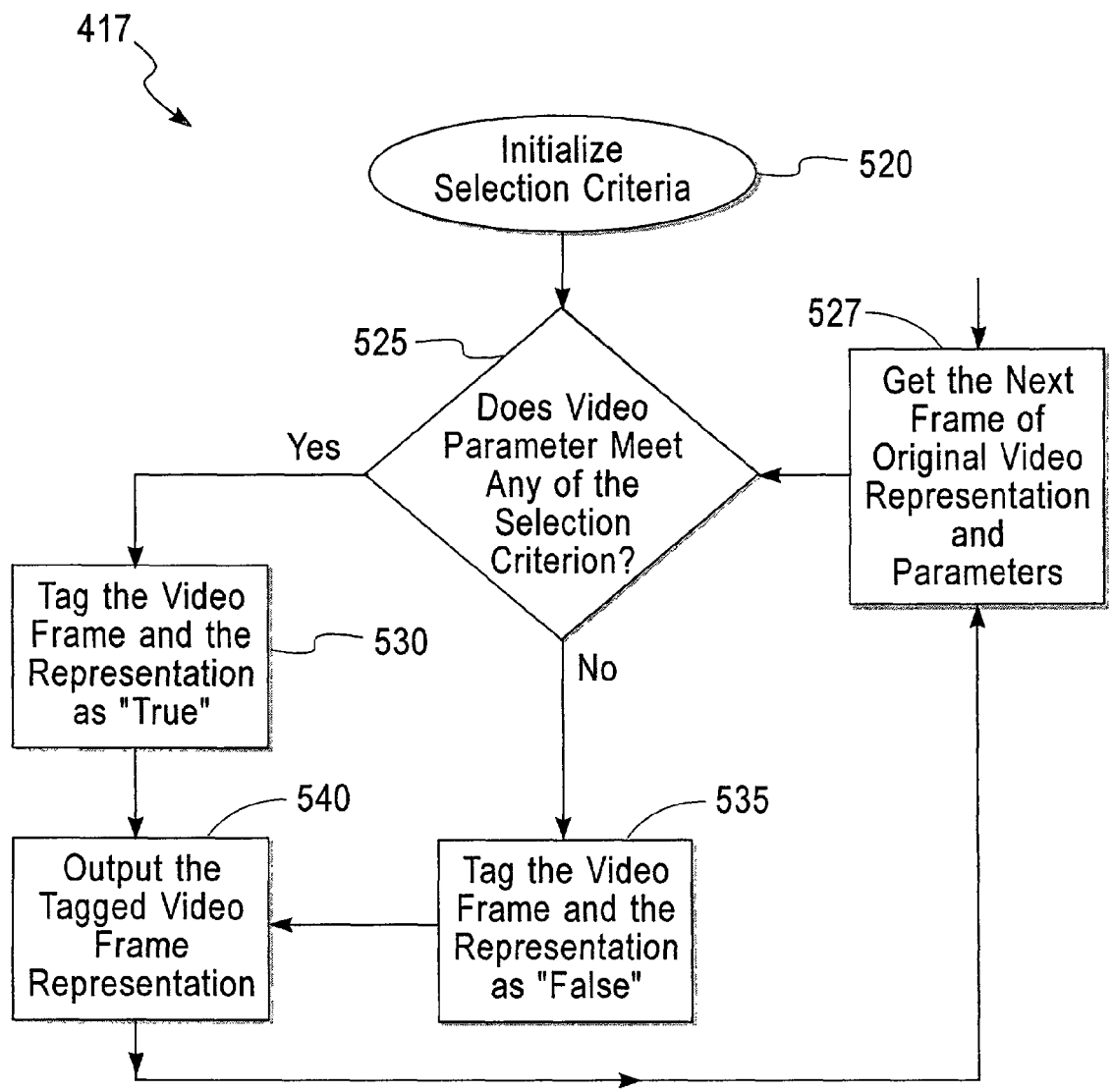
FIG. 5A is a flow chart of a selection process.
Figure 6:
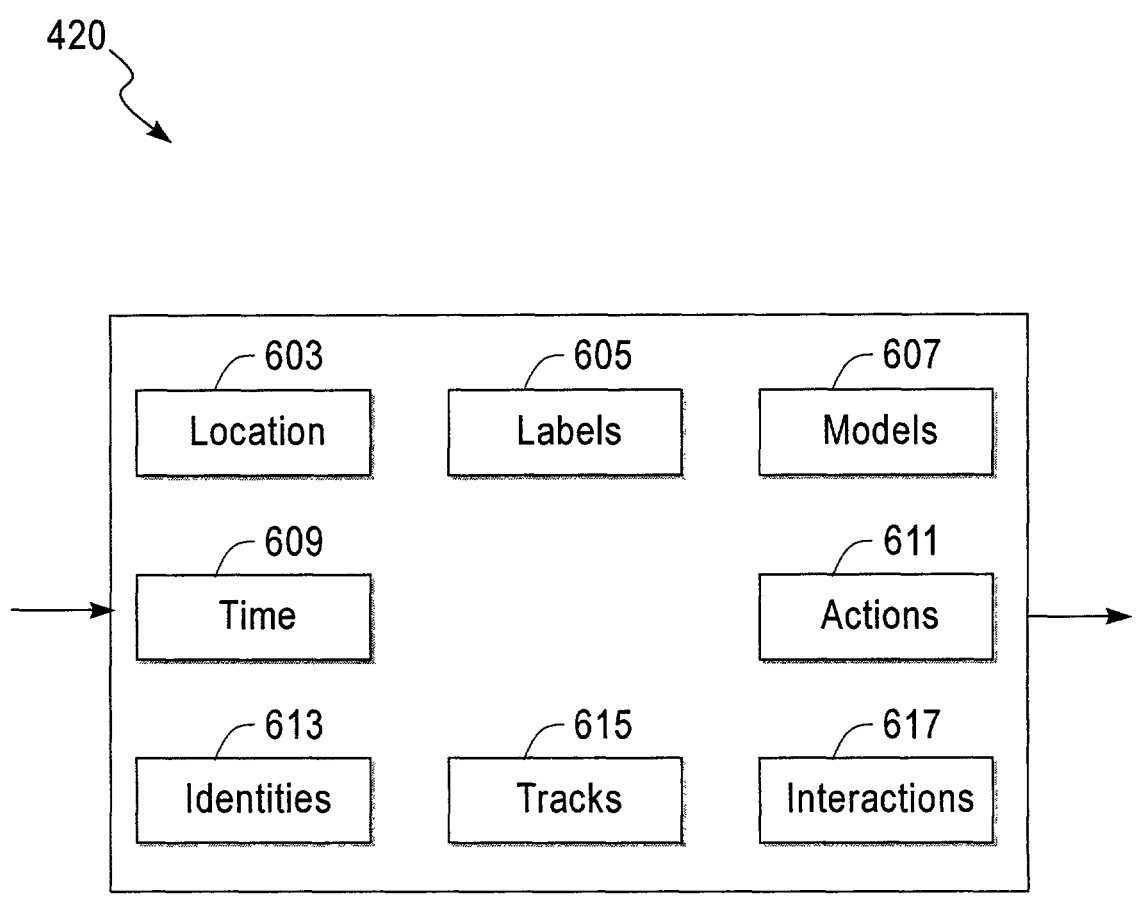
FIG. 6 presents different typical obscuration methods used on the selected video information.

FIG. 5A shows the process of (de)selection. Determined by the transformation profile and the identities, locations, times etc. Of the video source content, the selection criteria are initialized 520. For instance, a top secret location will always select the background location identifying information irrespective of the identities of the individuals within the scene and the times of the video capture. The process of the initialization could be a one time event or it could be occasional or it could be frequent. It can be triggered by the events in the scenery or it could driven by the administrative policies of the site or it could be remotely governed.

At the onset every new video frame 527, the content of the video frame as represented by the encoding system 120 are compared (525) against the selection policies prescribed at the time arrival of the video frame. An instance of the comparison could be, does the identity of person is included in the list of the identities to be selected as prescribed by the transformation profile? If the comparison yields an affirmative answer ("yes") 530, the representation in the frame is tagged to be "true" else the representation in the frame is tagged "false" 535. The tagged representation of the frame is outputted and the process of selection continues to obtain the next frame of the video 527.

The function of the obscuration method 420 is to remove a certain (sensitive) information content in the track attributes. It takes a attributes of track extracted by the video analysis (e.g., texture maps, silhouettes, models fits, actions, interactions, object labels, object identities 405) and produces obscured versions of the same attributes (e.g., texture maps, silhouettes, models fits, actions, interactions, object labels, object identities 425). The nature of the obscuration is determined by the selection methods and the transformation parameters.

The obscuration component can be any combination of the following obscuration methods 420: location obscuration 603, time obscuration 609, identity obscuration 613, model obscuration 607, action obscuration 611, interaction obscuration 617, track obscuration methods 615 as depicted in the FIG. 6.

We first describe location obscuration method 603.

The location obscuration specifies whether for each selected region, allow the system to specify whether the transformation is to exclusively obscure the scene location or whether the both the location as well as the events in the locations are to be obscured. In the latter case, further specifications of the events to be selectively obscured can also be specified through a joint (pairwise) specification of the event (e.g., any of the other obscuration methods as described below) and location obscuration method matrix. For instance, whether all the individuals in the selected region to be obscured. Whether specific individuals and specific individuals within this region of interest need to be obscured, etc.

One method of location obscuration is by removal. The background model as estimated by 520 can be completely removed from the scene to avoid dissemination of any information about the location of the scene.

One method of location obscuration is by iconization 603. The background model as estimated by 520 can be replaced by a general symbolic description to avoid dissemination of detailed information about the location of the scene.

One method of location obscuration is by caricaturization 603. The background model as estimated by 520 can be replaced by sufficiently general (perhaps, distorted) sketch of the scene to avoid dissemination of any detailed information about the location of the scene.

One method of location obscuration is by replacement 603. The background model as estimated by 520 can be replaced by a different background to avoid dissemination of information about the location of the scene.

One method of location obscuration 603 is by background model estimate rendered with a different resolution and/or with pseudo-color texture. For example, the background model as estimated by 520 can be replaced by a blurred version of the background estimate to avoid dissemination of detailed information (e.g., number of windows) about the location of the scene.

One method of location obscuration 603 is by random shuffling of individual (or blocks of) pixels background model estimate around. The random displacement of the pixels will create a meaningless background texture but the statistical analysis 890 may be able to infer some overall properties of the background (e.g., color of the background, is it likely to be outdoor) without actually revealing any particular information about the background location.

We now describe time obscuration method 609.

The time obscuration method specifies whether for each selected duration, allow the system to specify whether the transformation is to exclusively obscure the scene location or whether the both the location as well as the events in the locations are to be obscured. In the latter case, further specifications of the events to be selectively obscured can also be specified through a joint (pairwise) specification of the event (e.g., any of the other obscuration methods as described below) and time obscuration method matrix. For instance, whether all the individuals in the selected duration to be obscured. Whether specific individuals and specific individuals within this region of interest need to be obscured, etc.

One method of time obscuration is by subsampling (e.g., dropping intervening video frames) the frame rate of the selected video. The subsampling need not be uniform and may be performed, for example, in the units of scene changes.

One method of time obscuration is by time warping of the frame rate of the selected video. The time warping typically involves stretching time scale as a continuous function of time (frame rate).

One method of time obscuration is by permutation of the video frames the selected video. The resulting video may be meaningless (without spending inordinately compute intensive process to correctly reassemble it) but the statistical analysis 890 may be able to infer some overall properties of the video (e.g., how many distinct individuals were in the video) without actually revealing any particular temporal information about the video.

We now describe identification obscuration method 613.

One method of identity obscuration is by removal of the presence of the regions representing the identity. For example, the regions extracted by the connected components (340) of a particular person can be synthetically removed.

One method of identity obscuration is by iconization, i.e, the regions representing the identity are removed and a generic symbol describing the object replaces the original texture map. For example, the regions extracted by the connected components (340) of a particular person can be replaced by symbolic description.

One method of identity obscuration 613 is by silhouettes, i.e, the regions representing the identity are removed and a silhouette of the region replaces the original texture map. For example, the regions extracted by the connected components (340) of a particular person can be replaced by silhouettes (region outlines without revealing any appearance information) the which obscure their true identity.

One method of identity obscuration 613 is by selective subsampling/blurring, i.e, the regions representing the identity are blurred/subsampled to obscure the identity. For instance, any lossy compression schemes for foreground regions could be used for blurring.

One method of identity obscuration 613 is by model, i.e, the regions representing the identity are removed and a model fit of the region replaces the original texture map. For example, the regions extracted by the connected components (340) of a particular person can be replaced by skeleton fits (e.g., stick figure) which obscure the true identity of the human beings in the original scene. Any level of model representations could be used for obscuring the identity. The more detailed the model representation, the more distinctive information it can potentially convey about the identity of the person. For instance, very tall persons can be distinguished from the rest of the population simply based on their height.

We now describe model obscuration method 607.

One method of model obscuration 607 is by model shape substitution, i.e, the regions representing the identity are removed and a model shape parameters of a different identity in the video replaces the actions represented by the original texture map. Any level of model representations could be used for obscuring the identity. In this situation, it is more difficult to infer the true identity based on the shape parameters of the model although the temporal/behavioral biometrics (e.g., gait) may still give away the true identity of the person.

One method of model obscuration 607 is by model shape homogenization, i.e, the regions representing the identity are removed and a prototypical (e.g., average) model shape parameters replaces the actions represented by the original texture map. Any level of model representations could be used for obscuring the identity. In this situation, it is difficult to infer the true identity based on the shape parameters of the model although the temporal/behavioral biometrics (e.g., gait) may still give away the true identity of the person.

We now describe action obscuration method 611.

One method of action obscuration 611 is by model action removal, i.e, the sequence of model part movements representing the actions of an individual are removed and a coarse model shape (e.g., one cylinder) replaces the actions represented by the original texture map.

One method of action obscuration 611 is by model action homogenization, i.e, the sequence of model part movements representing the actions of an individual are removed and a prototypical (e.g., average) model action parameters replaces the actions represented by the original texture map.

One method of action obscuration 611 is by model action randomization, i.e, the sequence of model part movements representing the actions of an individual are removed and a random (e.g., average) model action parameters replaces the actions represented by the original texture map.

One method of action obscuration 611 is by model action iconization, i.e, the sequence of model part movements representing the actions of an individual are removed and a symbolic description of the action replaces the actions represented by the original texture map.

We now describe interaction obscuration method 617.

One method of interaction obscuration 617 is by model interaction removal, i.e, the sequence of model part movements representing the interactions of an individual are removed and a coarse model shape (e.g., one cylinder) replaces the interactions represented by the original texture map.

One method of interaction obscuration 617 is by model interaction homogenization, i.e, the sequence of model part movements representing the interactions of an individual are removed and a prototypical (e.g., average) model interaction parameters replaces the interactions represented by the original texture map.

One method of interaction obscuration 617 is by model interaction randomization, i.e, the sequence of model part movements representing the interactions of an individual are removed and a random (e.g., average) model interaction parameters replaces the interactions represented by the original texture map.

One method of interaction obscuration 617 is by model interaction iconization, i.e, the sequence of model part movements representing the interactions of an individual are removed and a symbolic description of the interaction replaces the interactions represented by the original texture map.

We now describe track obscuration method 615.

One method of track obscuration is deletion of the segments of the track. Another method of track obscuration is insertion of spurious segments of the track. Track can also be obscured by assigning incorrect/random labels to the tracks at the intersection of two or more tracks. Entirely spurious tracks can also be added with fictitious track labels.

Figure 6A:
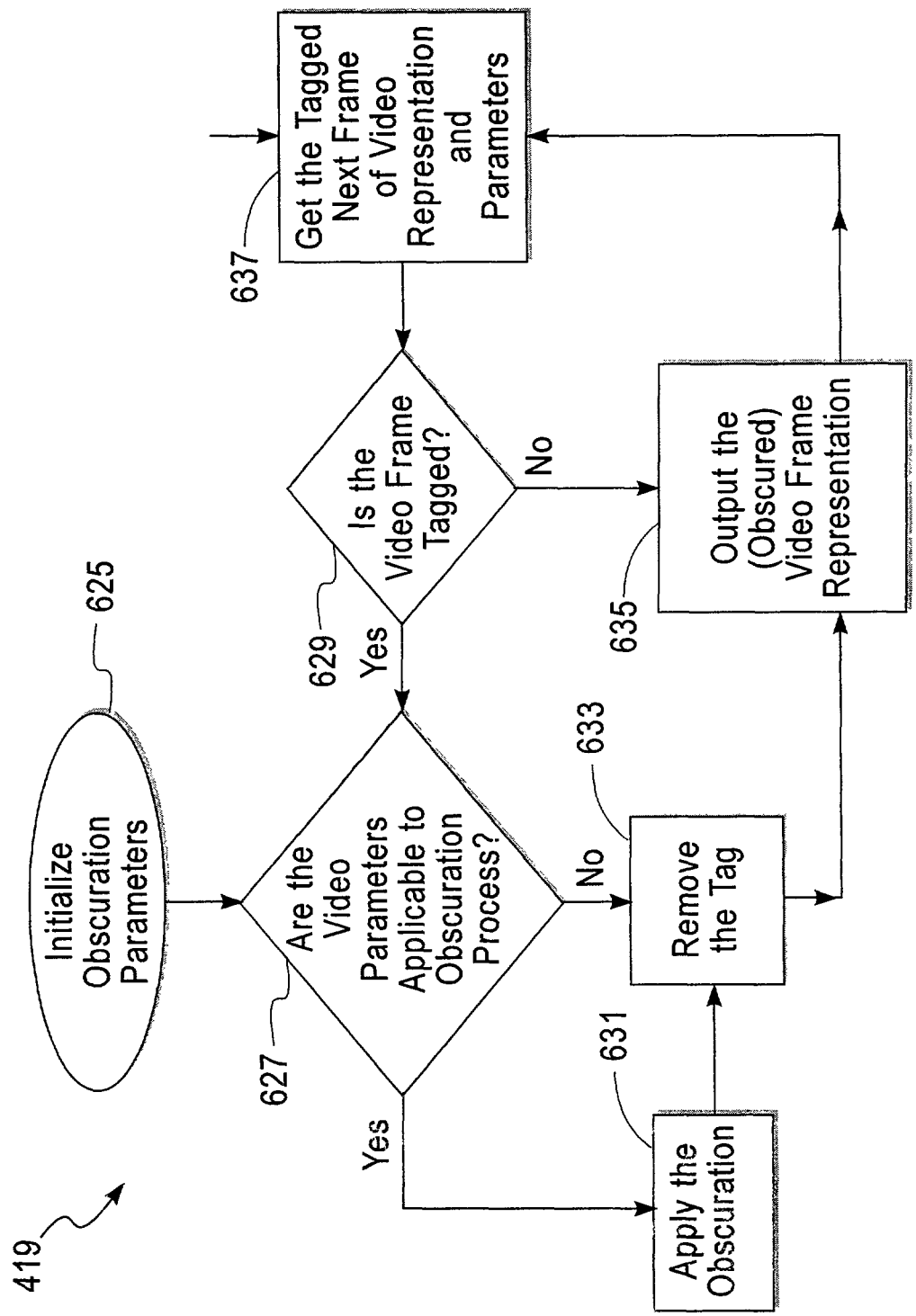
FIG. 6A is a flow chart of an obscuration process.

The process of obscuration is illustrated in FIG. 6A. Determined by the transformation profile and the identities, locations, times etc. Of the video source content, the obscuration criteria are initialized 625. For instance, a top secret location will always obscure the background location identity irrespective of the identities of the individuals within the scene and the times of the video capture. The process of the initialization could be a one time event or it could be occasional or it could be frequent. It can be triggered by the events in the scenery or it could driven by the administrative policies of the site or it could be remotely governed.

At the onset every new video tagged video frame representation 637 (which is 540, FIG. 5A) the content of the video frame as represented by the encoding system 120 are checked to see if the video frame representation is tagged by the selection process (629). If the video frame representation is indeed not tagged, the video frame is not selected and hence no obscuration methods need to be applied. In such an event, the output video frame representation is identical to the input frame representation (635). If the video frame representation is tagged, it implies that the frame is a selected frame and may undergo obscuration. A further check is made to see if the current obscuration parameters imply any meaningful obscuration to the presentation tagged video representation. For instance, if the present obscuration parameters only imply an identity obscuration and the present video frame does not have any identities, the obscuration method is not relevant. In such an event, the tag in the video representation is removed (633) and the output video frame representation (635) is same as the input video representation. In all other cases, the obscuration method indicated by the present obscuration parameters are applied to the present video frame representation (631), the tag in the present frame removed (633) and the obscured representation is output (635). The process of obscuration then continues to obtain the next frame of the video 637.

As mentioned earlier, the transformation methods 230 track related attributes (e.g., texture maps, silhouettes, class labels, coarse model fits, one or more fine model fits, actions, interactions) and transform the attributes to result in transformed attributes of the tracks. Some of the transformation may involve loss of information. When a particular component of the data is not completely specified or different components of the obscuration methods prescribe conflicting transformations, a default transformation or default priority of obscuration methods resolves the ambiguity. These defaults are specified in 270.

Figure 7:
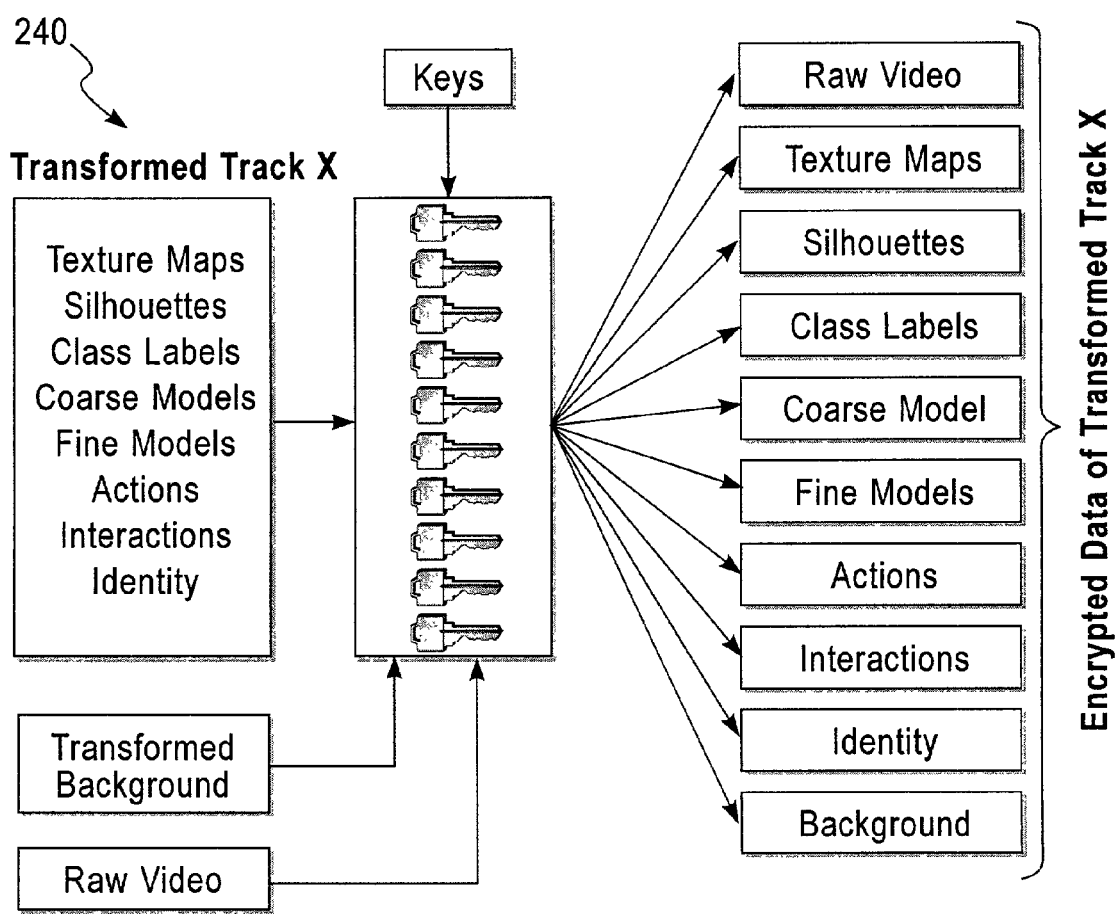
FIG. 7 shows a typical instantiation of encrypting transformed video information.

Encryption method 240 (FIG. 7) takes the transformed attributes of the tracks as inputs and produces an encrypted (e.g., encoded by public keys as in DES) version of the track attributes. In this scheme, a separate key may be used to encode different components of the track information (e.g., texture maps, silhouettes, class labels, coarse model fits, one or more fine model fits, actions, interactions) related to an identity. The keys used for the encryption involve identities of objects (as determined by authentication system 141 decisions) related to one or more tracks. The keys encode a method of exclusive authorization to access the video data related to one or more video tracks. Another function of 240 is to provide digital signatures related to the encoded data so that the authenticity of the video information can be vouched for. The encrypted video information may contain encoded version of the transformed video as well as the original video. Further, the encrypted video may consist information about the estimated background models. The encrypted video information may also contain sufficient information about authentication standards (e.g., how conservative the positive person identification method should be) and authorization provided to each authenticated identities (e.g., Will Smith gets authorization to access only coarse information in the video containing his close-up shots). When tracks of individuals are entwined (e.g., because of interactions of the corresponding individuals), access to the track data may require authorizations from more than one individual. For many reasons (e.g., efficiency, simplicity), it is possible to use same keys for different attributes of a track, different attributes of different tracks, same attributes of different tracks.

Figure 3A:
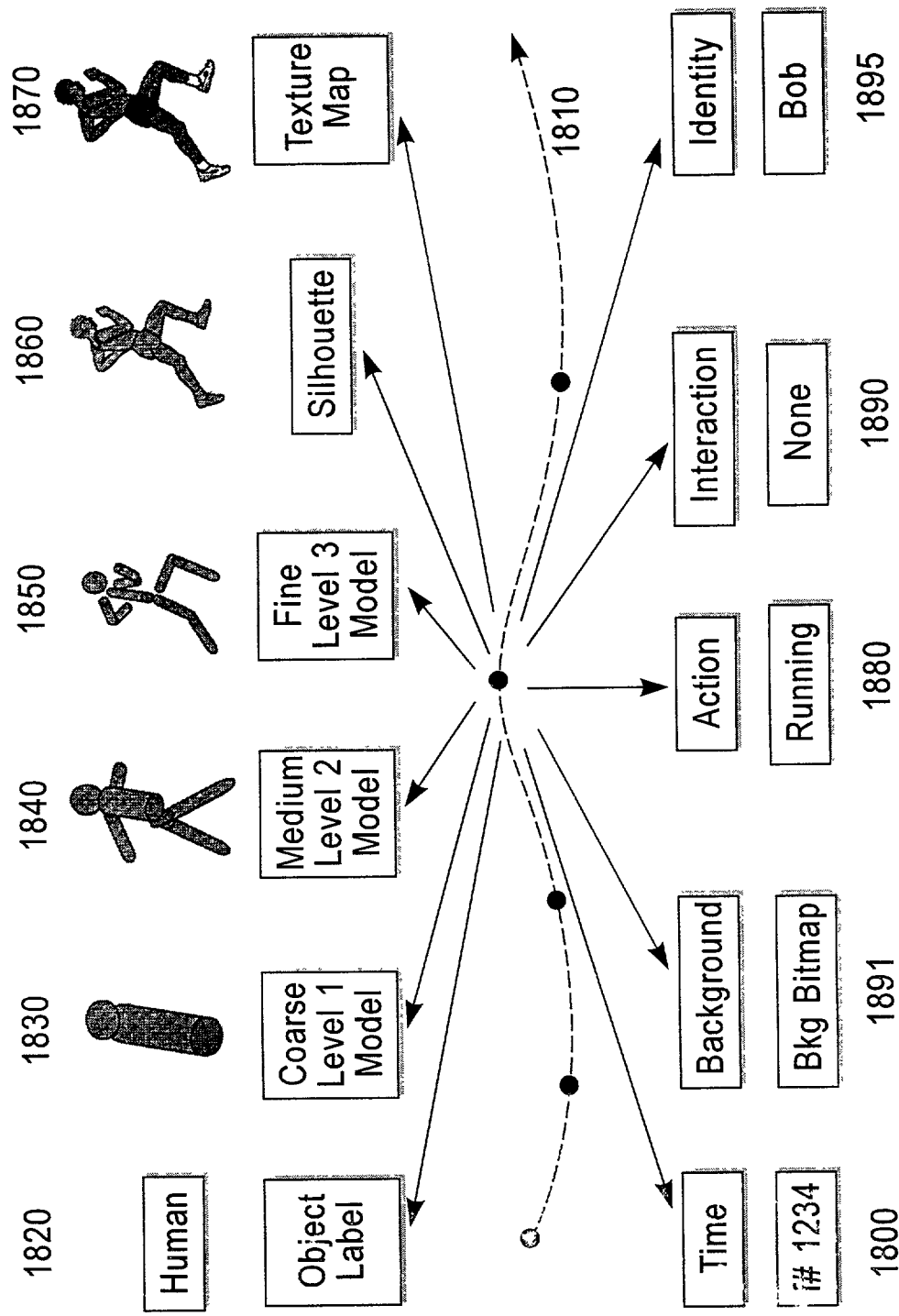
FIG. 3A shows a summary of different components of video information extracted by a typical instantiation of the video analysis subsystem.
Figure 7A:
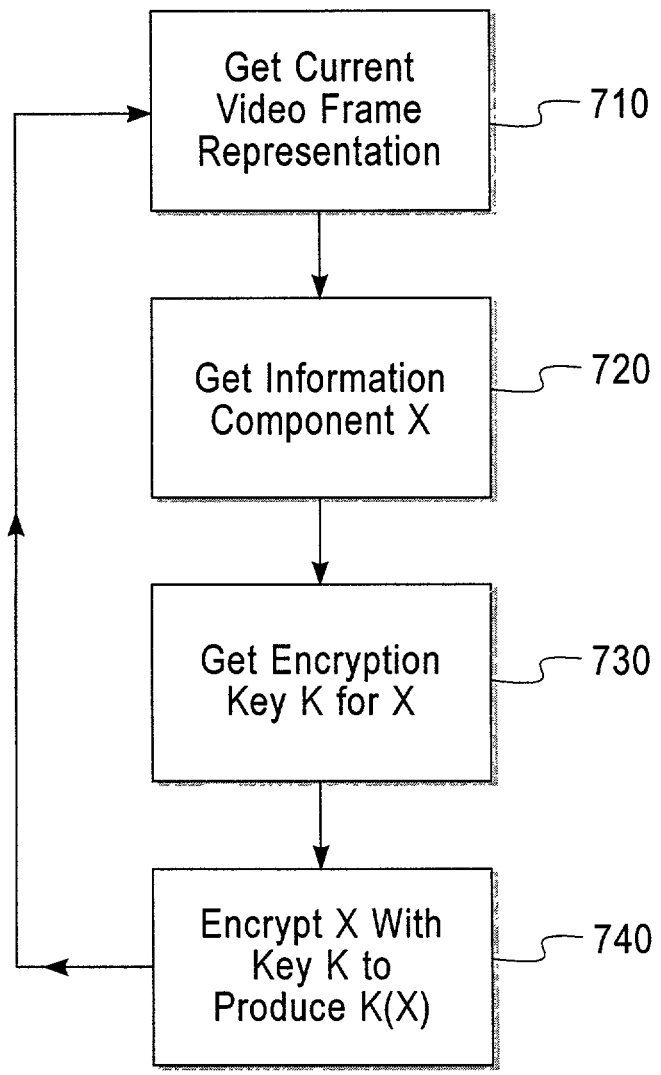
FIG. 7A shows a flow chart of typical encryption process for one component of video information.

Referring to FIG. 7A, the process of encryption of the transformed video is further explained for one generic video information content. As noted before (See FIG. 3A), there are several information components of the video information. These include, time 1800, background 1891, action 1880, interaction 1890, identity 1895, track 1810, texture map 1870, silhouette 1860, fine level models 1850, coarse level models 1830, 1840, object label 1820, and finally, the raw video information itself. FIG. 7A illustrates process of encrypting one (X) of these components of the information. Give a representation of the current frame of video (710), it extracts a particular information component (X) of the video information from the current frame (720). It additionally obtains key corresponding to information component X (possibly individual specific), from the key generation process (280), and encrypts the video information X using K to produce K(X).

Figure 7B:
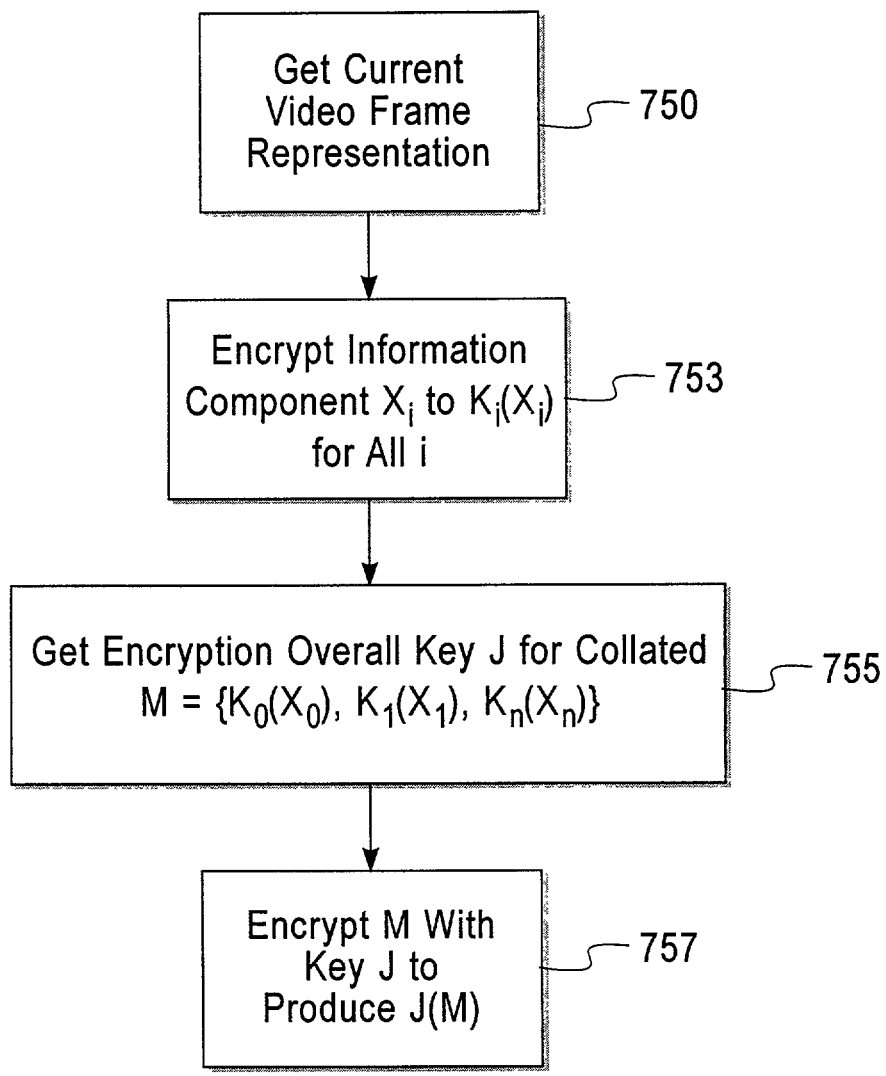
FIG. 7B shows a flow chart of typical encryption process for entire video information.

FIG. 7B illustrates the overall encryption process. Give a representation of the current frame of video (750), it uses information specific (X) encryption process described above (753) to encrypts the video information X using K to obtain the encrypted information produce K(X) for all X. It then collates all the encrypted specific (X) information to produce an overall vector of encrypted information (M, 755). The overall encrypted information is further encrypted with an overall key J to produce encrypted overall encrypted information (757). The encrypted overall encrypted information (757) may possibly include information about the identities, the system operating points, and other information which may be helpful at the decoding process. The overall encryption may also include processes such as compression to improve the bandwidth efficiency. The preferred embodiment of the encryption process uses public encryption method. Other methods of encryption are also within the scope of this invention.

Figure 8:
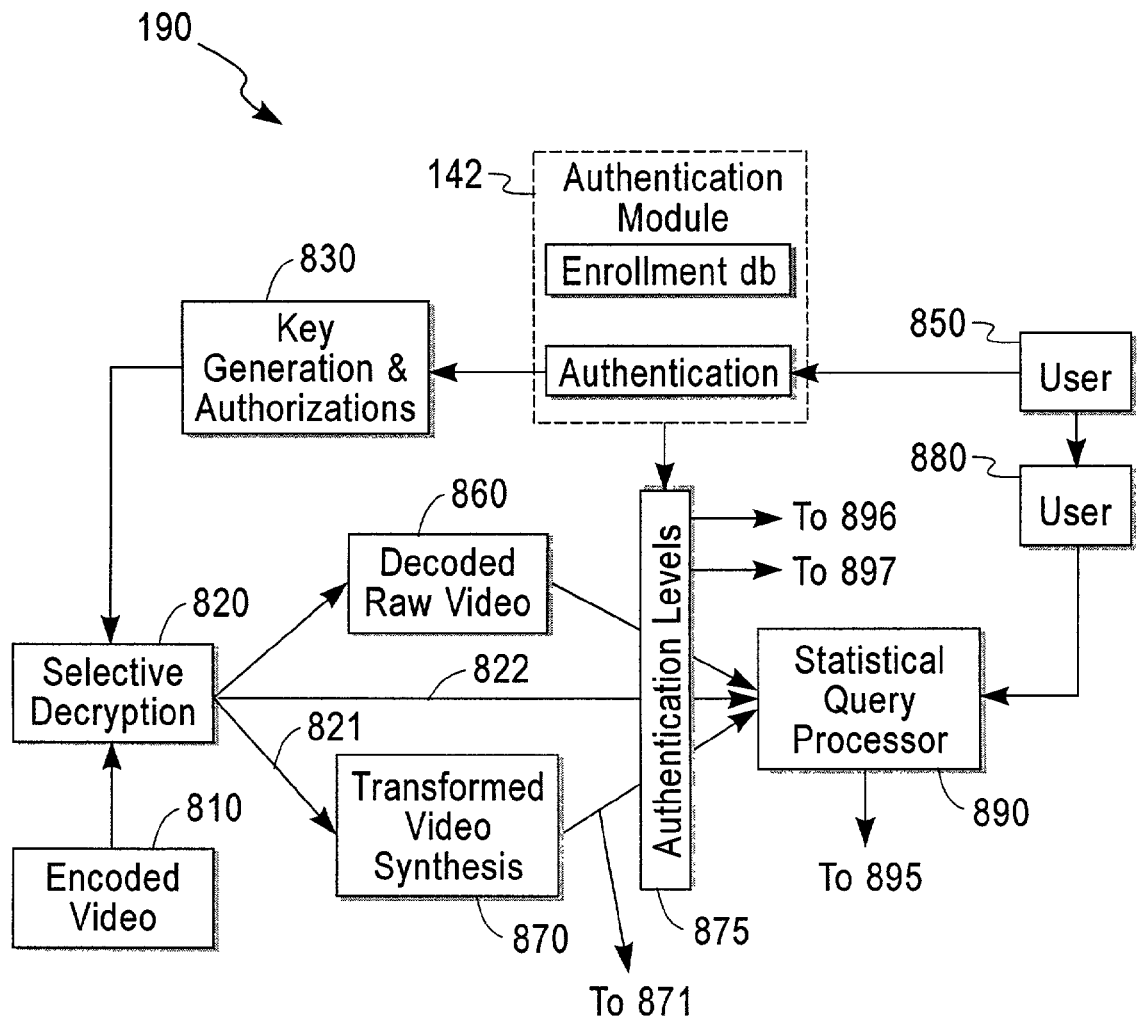
FIG. 8 presents an overview of a typical instantiation of the decoding system.

Referring to FIG. 8, a preferred instantiation of the decoding system 170 is shown. It comprises a means of authenticating user authorizations 142. The decisions generated within the authentication system An authentication module 142 enable release of appropriate (e.g., private) keys in the key generation method 830. This, in turn, enables a selective decoding of the encoded video 410 (same as in 290) generating decoded raw video 860, selective parameters of the transformed video 821, or both). Note that 860 represents some or all of the information in original video (as in 110, 210). Note also that 821 some or all of the information in the transformed video information as generated in 230. The extent/nature of recovery of original (210, 821) information depends upon appropriate authorizations released from authentication module 142. The extent of the recovery of the information from encoded video depends upon the nature of keys/authorizations released by 830 which in their turn depend upon the decisions of authentication module 142. In other words, the loss of information content from original video (110,210), original transformed video parameters as generated in 230 to decoded raw video 860, decoded transformed video parameters 821 depends upon the key generation/authorization 830 released by the user authentication procedures 142. Given the recovered parameters of the transformed video 821, 870 synthesizes the transformed video 871.

The decoding of the video itself does not necessarily imply user access to the results. The system permit direct user access to the selectively synthesized transformed video (897) and/or selectively decoded raw video (896) depending upon the sets of authorizations released by the user authentication module 142. Alternatively, the system may not allow direct user access to any video footage (either selectively recovered original raw video or selectively synthesized transformed video) at all and only permit user 850 to pose a (statistical) query 880 about the video content to the decoded raw video (860) and/or transform synthesized video (871) through a statistical query processor 890. The authorization to access the video and/or the query results is modulated by the authorization methods 875 as determined by the decisions made by the authentication module 142.

For instance, the law enforcement agencies requiring the most detailed viewing of the video will (after appropriate authentication procedures 142) be authorized (875) view the original video (896 which represents part or full of 210). Security personnel (after successful completion of appropriate authentication procedures 142) on the premise will be authorized (875) to see the transformed video (897 which is synthesized from part or full of the parameters of the transformed video information in 330) but may not be able to see the original video. A typical user, however, can neither see the original video (896) nor the transformed video (897). A typical user authentication 142 will authorize 875 passage of the transformed video 871, parameters of the transformed video 821 or the original raw video 860 to a statistical query processor 490 which will only provide query results 895 of queries of statistical nature (880) posed by user (850) and will not give away any sensitive information. Note that the law enforcement and security personnel may have access to the query processor 890 and its results 895.

Given the (private) keys released by the authorization module 830, Decryption method 820 (FIG. 9) takes an encrypted (e.g., encoded by public keys as in DES) version of the track attributes, encrypted background and encrypted raw video, generates a subset of transformed attributes of the tracks, background and raw video. What subset of the transformed track attributes are generated depends upon depending upon the number of valid (private) keys received. For instance, due to a limited the authorization of a user, only transformed silhouettes and transformed coarse models of individual tracks of all individuals in the video and fine models of his own track may generated. Default parameters of the decoding method may allow default decoding of the encrypted video information when keys corresponding to particular transformed attributes are not available/valid.

Given (a subset of) transformed attributes of the tracks, background and raw video, synthesis method (870, FIG. 10) generates the synthesized transformed video. Depending upon the authorization of the users, they may be able to directly access the video or will be able only access the statistical information in the transformed video through statistical query processor 490.

Figure 8A:
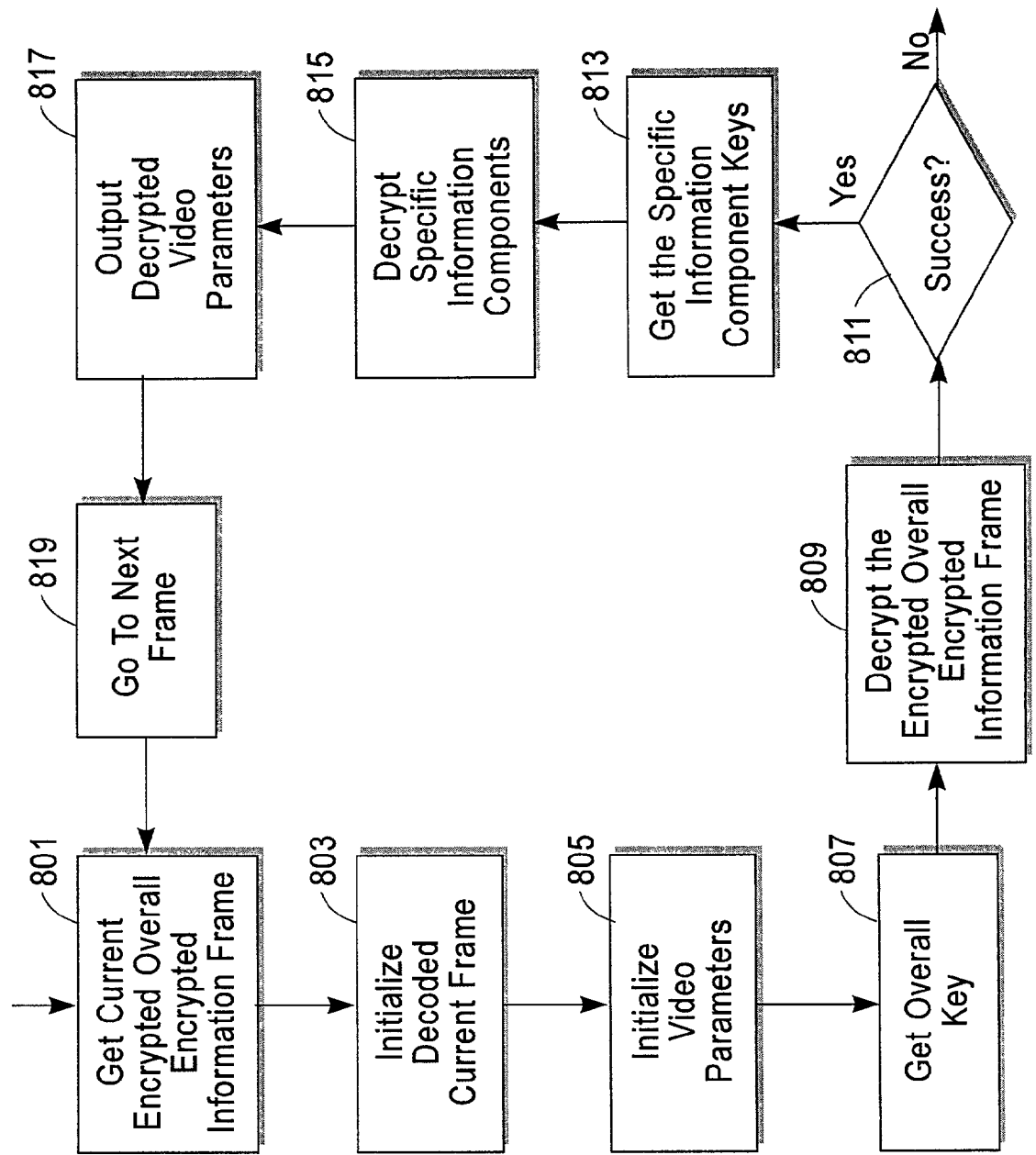
FIG. 8A is a flow chart of a selective decryption process.

FIG. 8A presents the flowchart of the process of selective decryption (820). In step 801, the decoding system obtain the next encrypted overall encrypted information (757). It starts with initializing resetting a fresh decoded frame (803). The initialized state of the decoded frame of video may be prescribed by the system policies at the video decoding end, or they may be determined by the outcome of the decoding process of the last frame. It is also envisaged that the default parameters of the decoding operation will be governed by the status/authorization of the user.

In step 805, it initializes the parameters of the video reconstruction (e.g., parameters of the 3D model). Again the default video parameters may be prescribed by the system policies or by the system inertia retained from the last frame. It then fetches the overall (private) key from the key generation process (807). In the next step (809), the system uses the overall key to decrypt the encrypted overall encrypted information of the current frame. If the user is already authenticated (by a system determined distinctive possession, knowledge, or biometrics) and is authorized to access the system, the overall key obtained from the key generation process will be able to decrypt the encrypted overall encrypted information. Based on the output of the decryption process, a test is performed to determine the success of the decryption process (811). If the test is not successful, the system determines overall authorization failure and the situation is handled as determined by the system policy. If the overall decryption is successful, the decoding system now has access to overall vector of encrypted information (M, 755, FIG. 7A). It then obtains other keys $K_x$ specific to the information content X the user is authorized to access (813) from the key generation process (830). In step 815, these specific keys $K_x$ are then used to decrypt the corresponding specific information content in the contained in overall vector of encrypted information (M, 755, FIG. 7A). Note that access to specific key $K_x$ does not necessarily mean access to information content X as the information X may have been blocked out at the encoding end. In step 817, the decrypted video information is passed on to the transformed video synthesis process (870, FIG. 8) and the decoded raw video process (860, FIG. 8). The decryption process then goes on to decrypt the next video frame (819). The video frame-by-frame decryption process as described here is a preferred embodiment. For efficiency or convenience, the decryption process can also be performed in other ways (e.g., using a segment of video at a time). Such embodiments of this invention are obvious to those skilled in the art and are under scope of this invention.

We claim:

1. A system for protecting privacy of information conveyed by one or more images in a common image stream, the system comprising:

a selector for selecting descriptive data from the one or more images in a video frame in the common image stream, wherein the descriptive data includes a plurality of different objects displayed within the video frame;

an encryption element configured to selectively encrypt each of the plurality of different objects displayed within the video frame in the common image stream with one or more different, respective encryption keys, wherein each of the plurality of different objects is encrypted with a different set of one or more encryption keys, wherein the one or more different, respective encryption keys are identity-specific based on an identifier of an individual user and generated using a key generation process based on the identifier, wherein an authentication module provides the identifier to the key generation process and a transformation parameter generation process in accordance with system policies in order to generate one or more encryption keys, wherein the plurality of different objects are labeled, and consistently labeled objects are encrypted and decrypted with consistent encryption keys; and an authorizer that provides authorization criteria with the one or more images, the descriptive data in an encrypted state capable of being decrypted only if one or more authorization inputs satisfy the authorization criteria, wherein each of the plurality of different objects is decrypted with one or more keys generated by the key generation process using the identifier upon authorization of the user.

2. A system, as in claim 1, wherein the system further comprises:

a transformer that transforms the descriptive data in the common image stream into a transformed state, the transformed state being the respective image encoded with descriptive information, where the descriptive data is obscured in the transformed state, and wherein the transformer is configured to transform the descriptive data by performing any one or more of the following: a removal of one or more frames of the image, and an insertion of one or more additional frames in the image.

3. A system, as in claim 1, where the images are frames in a video stream, and the video stream is processed any one or more of the following ways: (a) a frame analysis; (b) a transforming of extracted information (c) a selective encoding of information about one or more foreground objects; (d) a selective encoding of information about one or more backgrounds for each of the frames of the video; and (e) a creation of certificates for the encoded descriptions vouching for their authenticity.

4. The system, as in claim 1, wherein the obscuring of the descriptive information includes a change in sequence of two or more frames of the one or more of the images.

5. The system of claim 1, wherein at least two of the components respectively convey, in a common image of said one or more images in the common image stream, the identity of different users, wherein the encryption key with which a first component of the at least two of the components is encrypted is a first key, wherein the encryption key with which a second component of the at least two of the components is encrypted is a second key, wherein the authorization criteria indicates that a first user of said users is authorized to access the first component with the first key and is not authorized to access the second component with the second key and wherein the authorization criteria indicates that a second user of said users that is different from the first user is authorized to access the second component with the second key and is not authorized to access the first component with the first key.

6. A system for encrypting one or more images in a common image stream, the system comprising:

an image input device for receiving the images in a video frame in a common image stream, wherein at least one of the images includes a plurality of different objects displayed within the video frame;

an extractor that extracts one or more objects from the images;

a processor that processes the images;

a selector that selects one or more pieces of descriptive image information about the images according to a profile; and an encryption element configured to selectively encrypt each of the plurality of different objects displayed within the video frame in the common image stream with one or more different, respective encryption keys, wherein each of the plurality of different objects is encrypted with a different set of one or more encryption keys, wherein the one or more different, respective encryption keys are identity-specific based on an identifier of an individual user and generated using a key generation process based on the identifier, wherein an authentication module provides the identifier to the key generation process and a transformation parameter generation process in accordance with system policies in order to generate one or more encryption keys, wherein the plurality of different objects are labeled, and consistently labeled objects are encrypted and decrypted with consistent encryption keys, and an authorizer that provides authorization criteria with the one or more images, the descriptive data in an encrypted state capable of being decrypted only if one or more authorization inputs satisfy the authorization criteria, wherein each of the plurality of different objects is decrypted with one or more keys generated by the key generation process using the identifier upon authorization of the user.

7. A system, as in claim 6, where the processor at least classifies one or more of the objects into an object class and the descriptive information is about the object class.

8. A system, as in claim 6, where the processor at least identifies a relative identity of one or more of the objects in an object class and the descriptive information is about the relative identity, further comprising:

a video analysis and extraction system that identifies and tracks foreground regions, categorizes one or more objects into categories, segments one or more foreground regions into component parts, and tracks the component parts of the one or more objects to infer subsequent actions of the one or more objects, wherein the information obtained from tracking the one or more objects is employed to infer present and future interactions with other objects within the same image stream.

9. A system, as in claim 6, where the processor at least identifies an absolute identity of one or more of the objects in an object class and the descriptive information is about the object class.

10. A system, as in claim 6, where the one or more objects comprise two or more persons, and the processor analyzes the two or more persons to detect one or more interrelationships among body parts of the two or more persons.

11. A system, as in claim 6, where the processor relates identity of one or more of the objects to the objects in one or more previous images in one or more previous frames to form tracks of objects.

12. A system, as in claim 6, where the descriptive information includes one or more of the following: an identity, a location, a track, a time, a region of interest, a foreground region, and a model.

13. A system, as in claim 6, further comprising:

a transformer that obscures one or more of the pieces of descriptive information using an obscuring method selected according to the profile to create a transformed state of the images, where the transformer performs a reordering.

14. A system as in claim 6, further comprising:

a transformer that obscures one or more of the pieces of descriptive information using an obscuring method selected according to the profile to create a transformed state of the images, where the transformer requires an authorization.

15. A system, as in claim 6, further comprising:
a transformer that obscures one or more of the pieces of descriptive information using an obscuring method selected according to the profile to create a transformed state of the images, where the transformer obscures by a de-identification measure that includes any one or more of the following: a pseudo label.

16. A system, as in claim 6, further comprising:
a transformer that obscures one or more of the pieces of descriptive information using an obscuring method selected according to the profile to create a transformed state of the image; and
an authenticator that incorporates an access code with the obscured descriptive information in the images.

17. A system, as in claim 6, further comprising:
a transformer that obscures one or more of the pieces of descriptive information using an obscuring method selected according to the profile to create a transformed state of the images; and
an authenticator that incorporates an access code with the obscured descriptive information.

18. A system, as in claim 17, where the access code includes a level of detail to a reaction of a foreground object.

19. A system, as in claim 17, where the access code includes any one or more of the following non-image access codes: a token, a key, a password, a biometric, and information that is pre-registered and exclusively known to authorized users.

20. A system, as in claim 17, where the access code is a biometric within the images.

21. A system, as in claim 6, where the extractor extracts an object emotional state.

22. A system, as in claim 6, further comprising an authorizer that provides an authorization criteria with the images.

23. A system, as in claim 22, where the authorization criteria exists in levels of authorization.

24. A system, as in claim 23, where the authorization levels permit decoding of a foreground of the images.

25. A system, as in claim 24, where the decoding of the foreground is any one or more of the following: a time, an image resolution, a foreground object, a foreground object identity, a foreground object location, a track access authorization to a foreground object, a track access authorization to a level of detail of a foreground object, a reaction of a foreground object, a level of detail to a reaction of a foreground object, an interaction between two or more foreground objects, a detail of an interaction between two or more foreground objects, a foreground object position, a foreground object component, a foreground object pose, and a foreground object action.

26. A system, as in claim 23, where the authorization levels permit decoding of a background of the images.

27. A system, as in claim 26, where the decoding of the background is any one or more of the following: a time, an image resolution, a background object, an interaction between a foreground object and the background.

28. A system, as in claim 23, where the authorization levels are determined by an identity of a user or by an authority of the user.

29. A system, as in claim 23, where the authorization levels permit only statistical information about the sensitive information in the images and not to any aspect of any individual identity.

30. The system of claim 6, wherein the one or more objects comprise one or more persons, and the extractor extracts a relative identity of at least one of the one or more persons.

31. A system, as in claim 6, wherein the descriptive image information comprises an estimated speed of a person in a foreground region.

32. The system of claim 6, wherein at least two of the components respectively convey, in a common image of said one or more images in the common image stream, the identity of different users, wherein the encryption key with which a first component of the at least two of the components is encrypted is a first key, wherein the encryption key with which a second component of the at least two of the components is encrypted is a second key, wherein the system further comprises an authorizer configured to provide authorization criteria authorizing decryption of the at least two components that indicates that a first user of said users is authorized to access the first component with the first key and is not authorized to access the second component with the second key and wherein the authorization criteria indicates that a second user of said users that is different from the first user is authorized to access the second component with the second key and is not authorized to access the first component with the first key.

33. A method for selecting descriptive information from one or more images in a common stream, the method comprising the steps of:
selecting descriptive information about sensitive image information from one or more of the images in a video frame in the common image stream, wherein at least one of the images includes a plurality of different objects displayed within the video frame;
transforming the descriptive information into a transformed state defined by one or more pieces of the descriptive information using an obscuring method;
selectively encrypting each of the plurality of different objects displayed within the video frame in the common image stream with one or more different, respective encryption keys, wherein each of the plurality of different objects is encrypted with a different set of one or more encryption keys, wherein the one or more different, respective encryption keys are identity-specific based on an identifier of an individual user and generated using a key generation process based on the identifier, wherein an authentication module provides the identifier to the key generation process and a transformation parameter generation process in accordance with system policies in order to generate one or more encryption keys, wherein the plurality of different objects are labeled, and consistently labeled objects are encrypted and decrypted with consistent encryption keys; and
providing one or more authorization criteria, the authorization criteria determined from one or more second pieces of the descriptive information, wherein each of the plurality of different objects is decrypted with one or more keys generated by the key generation process using the identifier upon authorization of the user.

34. A method, as in claim 33, further comprising the step of:
decoding the transformed information to an untransformed state to be provided to a user inputting the authorization criteria only if the second piece of descriptive information provided by a user matches criteria about the transformed information.

35. The method of claim 33, wherein at least two of the components respectively convey, in a common image of said one or more images in the common image stream, the identity of different users, wherein the encryption key with which a first component of the at least two of the components is encrypted is a first key, wherein the encryption key with which a second component of the at least two of the components is encrypted is a second key, wherein the authorization criteria indicates that a first user of said users is authorized to access the first component with the first key and is not authorized to access the second component with the second key and wherein the authorization criteria specifies that a second user of said users that is different from the first user is authorized to access the second component with the second key and is not authorized to access the first component with the first key.

* * * * *